(12) United States Patent  (10) Patent No.: US 11,799,581 B2
Ootaki                     (45) Date of Patent:     Oct. 24, 2023

(54) OPTICAL TRANSMISSION APPARATUS, TERMINAL APPARATUS, OPTICAL COMMUNICATION SYSTEM, AND OPTICAL COMMUNICATION METHOD

(71) Applicant: NEC Corporation, Tokyo (JP)

(72) Inventor: Kazuhiro Ootaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 174 days.

(21) Appl. No.: 17/297,240

(22) PCT Filed: Nov. 12, 2019

(86) PCT No.: PCT/JP2019/044433
§ 371 (c)(1),
(2) Date: May 26, 2021

(87) PCT Pub. No.: WO2020/121716
PCT Pub. Date: Jun. 18, 2020

(65) Prior Publication Data
US 2022/0329342 A1    Oct. 13, 2022

(30) Foreign Application Priority Data
Dec. 12, 2018 (JP) ................. 2018-232610

(51) Int. Cl.
H04J 14/02 (2006.01)
(52) U.S. Cl.
CPC .................. H04J 14/0221 (2013.01)
(58) Field of Classification Search
CPC ............. H04J 14/0221; H04J 14/0201; H04J 14/0205; H04J 14/0278; H04J 14/0279;
(Continued)

(56) References Cited

U.S. PATENT DOCUMENTS 6,404,523 B1    6/2002 Morikawa et al.
9,065,243 B2 *  6/2015 Asobe .................. G02F 1/3532
(Continued)

FOREIGN PATENT DOCUMENTS

JP    2002033702 A    1/2002
JP    2002051013 A    2/2002
(Continued)

OTHER PUBLICATIONS

Extended European Search Report for EP Application No. 19897475.0 dated Jan. 7, 2022.
(Continued)

Primary Examiner — Hibret A Woldekidan
(74) Attorney, Agent, or Firm — Sughrue Mion, PLLC

(57) ABSTRACT

An optical signal adjustment unit (1) is configured in such a way that optical signals with different wavelengths are input thereto, and adjusts an intensity of each optical signal based on an intensity change in a transmission line, and outputs the optical signals. A dummy light output unit (2) outputs dummy lights (D) with different wavelengths, each dummy light having an intensity based on an intensity change in a transmission line. A control unit (4) identifies the dummy light corresponding to each optical signal, and controls the intensity of the identified dummy light based on the intensity of the optical signal corresponding to the identified dummy light and output from the optical signal adjustment unit (1). A multiplexing unit (3) outputs a wavelength-multiplexed optical signal (L) where the dummy light (D) and the optical signal (L10) output from the optical signal adjustment unit are combined.

16 Claims, 23 Drawing Sheets

(58) Field of Classification Search
CPC ............... H04J 14/0227; H04J 14/0212; H04J
14/0213; H04J 14/0206; H04J 14/0246;
H04J 14/0276; H04J 14/0204; H04J
14/02; H04J 14/0209; H04J 14/021; H04J
14/0287; H04J 14/0289; H04J 14/00;
H04J 14/0267; H04J 14/0216; H04J
14/0272; H04B 10/40; H04B 10/564;
H04B 10/572; H04B 10/502; H04B
10/60; H04B 10/524; H04B 10/5057;
H04B 10/07955; H04B 10/50; H04B
10/506; H04B 10/07957; H04B 10/54;
H04B 10/073; H04B 10/077; H04B
10/0775; H04B 2210/07; H04B 10/0777;
H04B 10/0797
See application file for complete search history.

(56) References Cited

U.S. PATENT DOCUMENTS

| 10,735,091 | B2 * | 8/2020 | Inoue | H04J 14/02 |
| 11,115,128 | B2 * | 9/2021 | Ootaki | H04J 14/02 |
| 2002/0015202 | A1 * | 2/2002 | Michishita | H04J 14/02 398/91 |
| 2003/0081282 | A1 * | 5/2003 | Yamakawa | H04J 14/0227 398/79 |
| 2005/0024715 | A1 * | 2/2005 | Inoue | H04J 14/0221 359/337 |
| 2007/0264013 | A1 | 11/2007 | Hasuo et al. | |
| 2008/0304829 | A1 * | 12/2008 | Sato | H04J 14/0221 398/79 |
| 2008/0310858 | A1 | 12/2008 | Lu et al. | |
| 2013/0058647 | A1 | 3/2013 | Boertjes et al. | |
| 2014/0161446 | A1 * | 6/2014 | Lee | H04J 14/0221 398/67 |
| 2014/0286635 | A1 * | 9/2014 | Kaneko | H04J 14/0221 398/34 |

FOREIGN PATENT DOCUMENTS

| JP | 2003143113 A | 5/2003 |
| JP | 2005051598 A | 2/2005 |
| JP | 2014187671 A | 10/2014 |
| WO | 2018065327 A1 | 4/2018 |

OTHER PUBLICATIONS

International Search Report of PCT Application No. PCT/JP2019/044433 dated Jan. 28, 2020.

* cited by examiner

OPTICAL TRANSMISSION APPARATUS, TERMINAL APPARATUS, OPTICAL COMMUNICATION SYSTEM, AND OPTICAL COMMUNICATION METHOD

This application is a National Stage Entry of PCT/JP2019/044433 filed on Nov. 12, 2019, which claims priority from Japanese Patent Application 2018-232610 filed on Dec. 12, 2018, the contents of all of which are incorporated herein by reference, in their entirety.

TECHNICAL FIELD

The present invention relates to an optical transmission apparatus, a terminal apparatus, an optical communication system, and an optical communication method.

BACKGROUND ART

In an optical submarine cable system, an optical transmission apparatus that is installed in a land terminal station transmits a wavelength-multiplexed optical signal through an optical submarine cable. In order to compensate for an optical loss due to transmission through an optical submarine cable, a plurality of optical amplifiers are generally inserted into the optical submarine cable. Each optical amplifier amplifies an input wavelength-multiplexed optical signal to a certain intensity and outputs the amplified signal. Thus, when a wavelength-multiplexed optical signal is amplified while one wavelength included therein is blocked, for example, the intensities of the other wavelengths increase significantly. Since an increase in an intensity of an optical signal leads to degradation of signal quality due to nonlinear effects, a technique that, when one wavelength of a wavelength-multiplexed optical signal is blocked, for example, adds a dummy light corresponding to the blocked wavelength and thereby suppresses the variation of the intensity of each wavelength of the wavelength-multiplexed optical signal.

As a technique of using a dummy light, an optical transmission apparatus that uses a dummy light in a single wideband (bandwidth) or dummy lights in a plurality of narrow bands (channel widths) for each subband is proposed (optical transmission apparatus). When inserting a new optical signal into a subband where a plurality of dummy lights in narrow bands are used, this optical transmission apparatus adjusts the intensities of the plurality of dummy lights in this subband and thereby maintains a constant intensity of a wavelength-multiplexed optical signal.

CITATION LIST

Patent Literature

Patent Literature 1: Japanese Unexamined Patent Application Publication No. 2014-187671

SUMMARY OF INVENTION

Technical Problem

A gain of an optical amplifier inserted into an optical submarine cable and an optical loss due to transmission of an optical signal through an optical submarine cable vary depending on a wavelength, thus having a wavelength dependence. Therefore, when a wavelength-multiplexed optical signal in which optical signals with different wavelengths have the same intensity is transmitted through the optical submarine cable, for example, the intensities become different from wavelength to wavelength. Differences in the intensities of the optical signals generated in this manner cause nonlinear effects and degradation of a signal-to-noise ratio. One way to suppress the occurrence of nonlinear effects and the degradation of the signal-to-noise ratio is to apply, to the wavelength-multiplexed optical signal, an intensity difference (pre-emphasis) for each wavelength based on an inverse wavelength dependence that cancels out the wavelength dependence occurring in the wavelength-multiplexed optical signal due to transmission, and then output the wavelength-multiplexed optical signal to the optical submarine cable.

However, in Patent Literature 1, when adjusting an intensity of a dummy light, a dummy light whose intensity is to be adjusted is not identified among a plurality of dummy lights in narrow bands. Therefore, when inserting the new optical signal, the wavelength-multiplexed optical signal after the new optical signal is inserted does not have the inverse wavelength dependence that cancels out the wavelength dependence of the optical submarine cable. As a result, the degradation of signal quality based on the wavelength dependence in the optical submarine cable is not appropriately suppressed.

The present invention has been made in view of the above-described circumstances, and an object of the present invention is to flexibly control dummy lights included in a wavelength-multiplexed optical signal and suppress degradation of signal quality.

Solution to Problem

An optical transmission apparatus according to one aspect of the present invention includes: an optical signal adjustment unit configured to be capable of receiving input of a plurality of optical signals with different wavelengths, adjust an intensity of each of the plurality of optical signals based on an intensity change in a transmission line, and output the optical signals; a dummy light output unit configured to output a plurality of dummy lights with different wavelengths, each dummy light having an intensity based on an intensity change in a transmission line; a control unit configured to identify the dummy light corresponding to each of the optical signals, and control an intensity of the identified dummy light based on an intensity of the optical signal corresponding to the identified dummy light and output from the optical signal adjustment unit; and a multiplexing unit configured to combine the dummy light and the optical signal output from the optical signal adjustment unit to output a wavelength-multiplexed optical signal.

A terminal apparatus according to one aspect of the present invention including: one or more optical transceivers; and an optical transmission apparatus configured to receive input of a plurality of optical signals with different wavelengths from the one or more optical transceivers, in which the optical transmission apparatus includes: an optical signal adjustment unit configured to be capable of receiving input of the plurality of optical signals, adjust an intensity of each of the plurality of optical signals based on an intensity change in a transmission line, and output the optical signals; a dummy light output unit configured to output a plurality of dummy lights with different wavelengths, each dummy light having an intensity based on an intensity change in a transmission line; a control unit configured to identify the dummy light corresponding to each of the optical signals, and control an intensity of the identified dummy light based on an intensity of the optical signal corresponding to the identified dummy light and output from the optical signal adjustment unit; and a multiplexing unit configured to combine the dummy light and the optical signal output from the optical signal adjustment unit to output a wavelength-multiplexed optical signal.

An optical communication system according to one aspect of the present invention includes: a first terminal station configured to output a wavelength-multiplexed optical signal; and a second terminal station configured to receive the wavelength-multiplexed optical signal, in which the first terminal station includes: one or more optical transceivers; and an optical transmission apparatus configured to receive input of a plurality of optical signals with different wavelengths from the one or more optical transceivers, and the optical transmission apparatus includes: an optical signal adjustment unit configured to be capable of receiving input of the plurality of optical signals, adjust an intensity of each of the plurality of optical signals based on an intensity change in a transmission line, and output the optical signals; a dummy light output unit configured to output a plurality of dummy lights with different wavelengths, each dummy light having an intensity based on an intensity change in a transmission line; a control unit configured to identify the dummy light corresponding to each of the optical signals, and control an intensity of the identified dummy light based on an intensity of the optical signal corresponding to the identified dummy light and output from the optical signal adjustment unit; and a multiplexing unit configured to combine the dummy light and the optical signal output from the optical signal adjustment unit to output the wavelength-multiplexed optical signal.

An optical communication method according to one aspect of the present invention includes: adjusting an intensity of each of a plurality of optical signals with different wavelengths based on an intensity change in a transmission line and outputting the optical signals; outputting a plurality of dummy lights with different wavelengths, each dummy light having an intensity based on an intensity change in a transmission line; identifying the dummy light corresponding to each of the optical signals, and controlling an intensity of the specified dummy light based on the intensity of the optical signal based on an intensity change in the transmission line corresponding to the identified dummy light; and outputting a wavelength-multiplexed optical signal in which the dummy light and the optical signal with an adjusted intensity are combined.

Advantageous Effects of Invention

The present invention allows flexibly controlling dummy lights included in a wavelength-multiplexed optical signal and suppressing degradation of signal quality.

DESCRIPTION OF EMBODIMENTS

Example embodiments of the present invention will be described hereinafter with reference to the drawings. In the

First Example Embodiment

Figure 1:
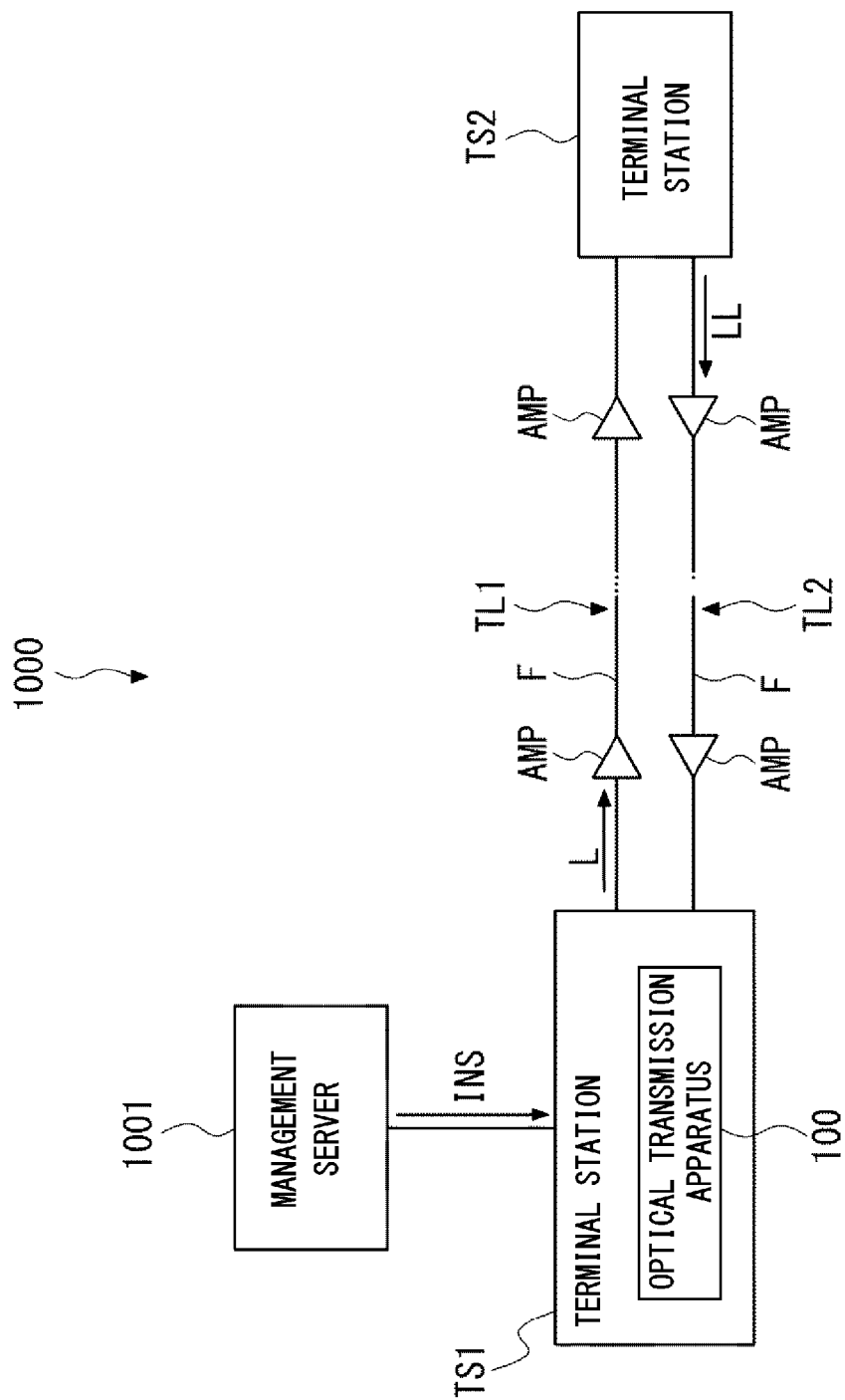
FIG. 1 is a view showing a basic configuration of an optical communication system including an optical transmission apparatus according to a first example embodiment.

An optical transmission apparatus 100 according to a first example embodiment is described hereinafter. FIG. 1 shows a basic configuration of an optical communication system 1000 including the optical transmission apparatus 100 according to the first example embodiment. The following description assumes that the optical transmission apparatus 100 is installed in a land terminal station included in the optical communication system 1000 that constitutes an optical submarine network.

FIG. 1 schematically shows a configuration example of the optical communication system 1000 according to the first example embodiment. In this example, the optical communication system 1000 includes terminal stations TS1 and TS2, an optical amplifier AMP, an optical fiber F, and a management server 1001. The terminal stations TS1 and TS2 are terminal stations installed on land. The terminal station TS1 includes the optical transmission apparatus 100.

The management server 1001 is configured to be able to control the operation of the terminal station TS1 and the optical transmission apparatus 100 by providing an instruction signal INS.

The terminal station TS1 and the terminal station TS2 are connected by a transmission line that is installed on land or under the sea and includes an optical fiber F transmitting an optical signal. In this example, a transmission line that transmits an optical signal from the terminal station TS1 (first terminal station) to the terminal station TS2 (second terminal station) is referred to as a transmission line TL1. A transmission line that transmits an optical signal from the terminal station TS2 to the terminal station TS1 is referred to as a transmission line TL2. Note that another apparatus such as an optical submarine branching apparatus that adds/drops an optical signal may be inserted into the transmission lines TL1 and TL2 according to need.

In each of the transmission lines TL1 and TL2, one or more optical amplifiers AMP that amplify an optical signal are inserted.

In this example embodiment, a wavelength-multiplexed optical signal L (first wavelength-multiplexed optical signal) is output from the terminal station TS1 to the terminal station TS2 through the transmission line TL1. In the wavelength-multiplexed optical signal L, optical signals with one or more wavelengths (channels) to be transmitted are wavelength-multiplexed. A wavelength-multiplexed optical signal LL (second wavelength-multiplexed optical signal) is output from the terminal station TS2 to the terminal station TS1 through the transmission line TL2.

Figure 2:
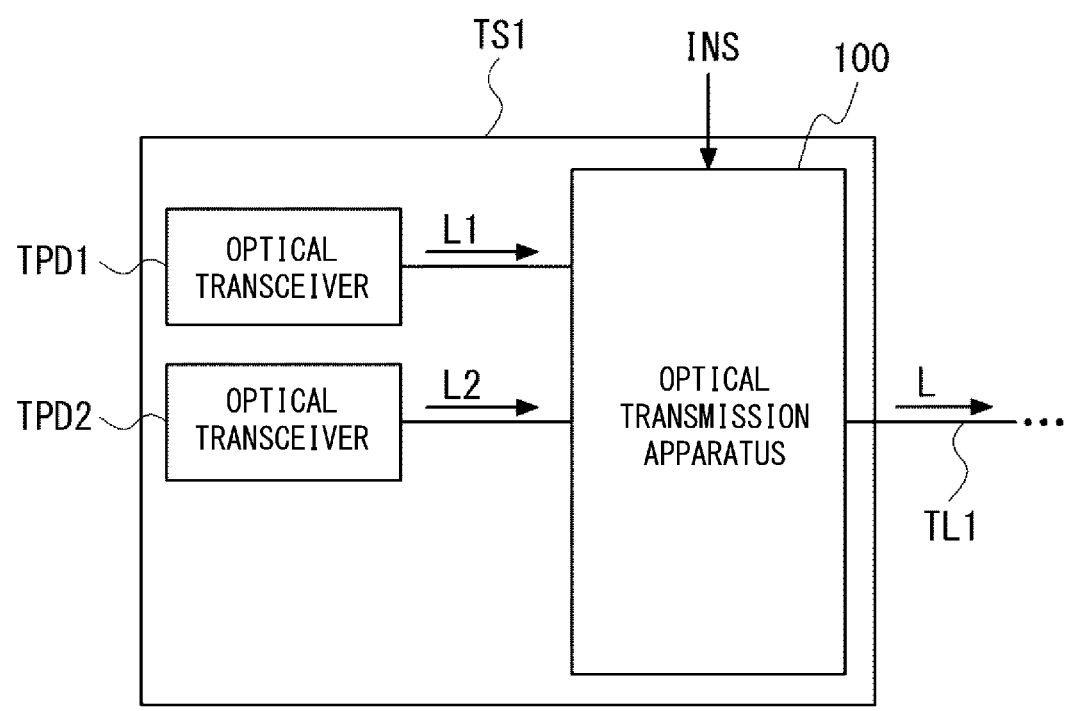
FIG. 2 is a view schematically showing a configuration of a terminal station according to the first example embodiment.

A configuration of the terminal station TS1 according to this example embodiment is described hereinafter. The terminal station TS1, like a general terminal station, includes an optical transmission apparatus and a plurality of optical transceivers. FIG. 2 schematically shows the configuration of the terminal station TS1 according to the first example embodiment. In this example, as shown in FIG. 2, the terminal station TS1 includes the optical transmission apparatus 100 and optical transceivers TPD1 and TPD2, and the optical transmission apparatus 100 and the optical transceivers TPD1 and TPD2 constitute a terminal apparatus in the terminal station TS1.

The optical transceivers TPD1 and TPD2 are connected to the optical transmission apparatus 100 by optical fibers, for example, and communicate optical signals with another terminal station or the like through the optical transmission apparatus 100. A plurality of optical transceivers included in a terminal station are not necessarily the optical transceivers of the same type, and optical transceivers having different functions or optical transceivers from different vendors can be used as appropriate.

In this example, an optical signal L1 is input from the optical transceiver TPD1 and an optical signal L2 is input from the optical transceiver TPD2 to the optical transmission apparatus 100. Each of the optical signals L1 and L2 includes an optical signal with one or more wavelengths.

The optical transmission apparatus 100 combines the optical signal L1 and the optical signal L2, and generates the wavelength-multiplexed optical signal L that includes the combined optical signal and a dummy light. Further, to compensate for wavelength dependence of a light intensity caused by nonlinear effects and losses generated by transmission through the transmission line TL1, the optical transmission apparatus 100 applies an intensity difference (pre-emphasis) for each wavelength based on an inverse wavelength dependence that cancels out this wavelength dependence to the optical signal and the dummy light included in the wavelength-multiplexed optical signal L. The optical transmission apparatus 100 outputs the wavelength-multiplexed optical signal L after the pre-emphasis is applied to the transmission line TL1.

Pre-emphasis that is applied to a wavelength-multiplexed optical signal is described hereinafter. When a wavelength-multiplexed optical signal is transmitted through a transmission line, an intensity of a light (an optical signal and a dummy light) included in the wavelength-multiplexed optical signal changes due to the nonlinear effects occurring during amplification in optical amplifiers inserted into the transmission line and the transmission loss in the transmission line. It is known that an intensity change of the light depends on a wavelength.

Figure 3:
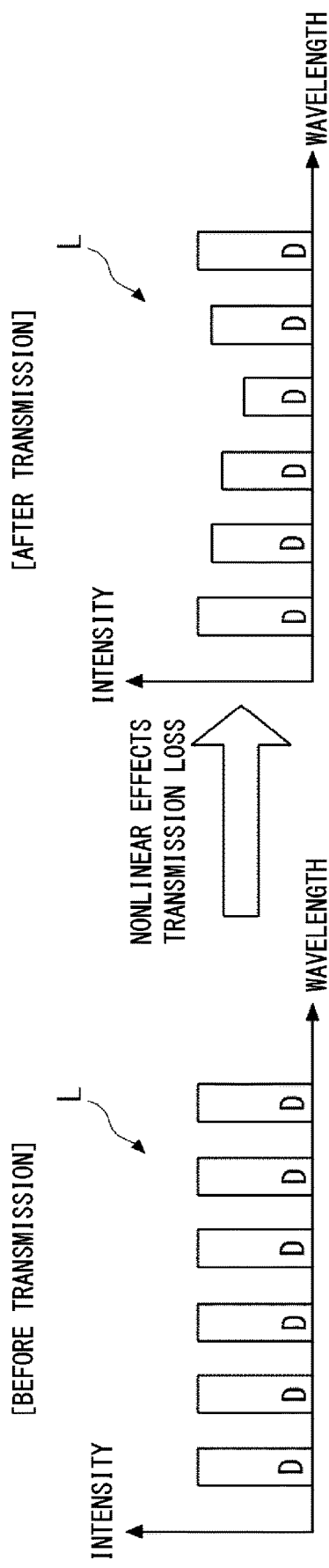
FIG. 3 is a view showing an intensity change of a wavelength-multiplexed optical signal before and after transmission in the case where pre-emphasis is not applied.

FIG. 3 is a view showing an intensity change of a wavelength-multiplexed optical signal before and after transmission in the case where pre-emphasis is not applied. The wavelength-multiplexed optical signal L shown in FIG. 3 includes a plurality of dummy lights D with different center wavelengths. In this example, the dummy lights D have the same intensity before input to the transmission line.

When the wavelength-multiplexed optical signal L is transmitted through the transmission line, the intensities of the dummy lights D differently change depending on their wavelengths as shown in FIG. 3. As a result, the intensities of the dummy lights D become non-uniform. Therefore, when the wavelength-multiplexed optical signal L is transmitted with optical signals being multiplexed therewith, the intensities of the optical signals also become non-uniform. Since it is preferred that the intensities of the optical signals included in the wavelength-multiplexed optical signal after transmission are uniform, pre-emphasis is applied to the wavelength-multiplexed optical signal before transmission in order to cancel out the wavelength dependence of the intensity change occurring after transmission.

Figure 4:
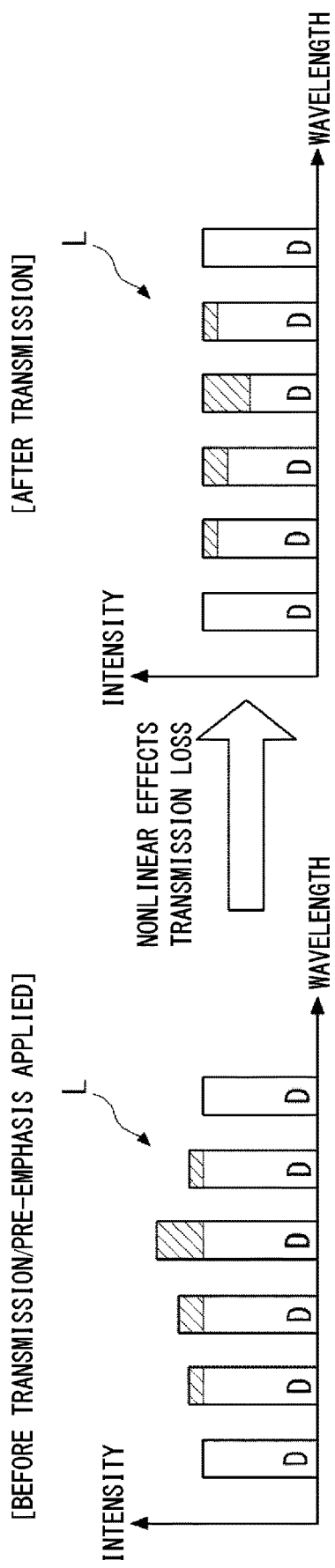
FIG. 4 is a view showing an intensity change of a wavelength-multiplexed optical signal before and after transmission in the case where pre-emphasis is applied.

FIG. 4 is a view showing an intensity change of a wavelength-multiplexed optical signal before and after transmission in the case where pre-emphasis is applied. In FIG. 4, the wavelength-multiplexed optical signal L to which pre-emphasis, which is the inverse wavelength dependence from the wavelength dependence after transmission shown in FIG. 3, is applied to the wavelength-multiplexed optical signal before transmission that includes a plurality of dummy lights with the uniform intensities, is used. In FIG.

4, the intensities of the dummy lights D included in the wavelength-multiplexed optical signal L before transmission is adjusted by the pre-emphasis as indicated by the hatching.

When the wavelength-multiplexed optical signal L after the pre-emphasis is applied is transmitted through the transmission line, the intensity changes having the same wavelength dependence as in FIG. 3 occur due to transmission. However, in this example, since the intensity difference (pre-emphasis) for each wavelength based on the inverse wavelength dependence is applied to the wavelength-multiplexed optical signal L before transmission, the wavelength dependence due to transmission is canceled out by the inverse wavelength dependence. In FIG. 4, the intensities of the dummy lights D included in the wavelength-multiplexed optical signal L after transmission is compensated for by the pre-emphasis as indicated by the hatching.

As a result, the intensities of the dummy lights with a plurality of wavelengths included in the wavelength-multiplexed optical signal L after transmission are equalized.

Further, the intensities of the optical signals after transmission also change depending on the wavelength, just like the dummy lights. Therefore, by inserting the optical signals to the wavelength-multiplexed optical signal and applying the pre-emphasis, the intensities of the optical lights after transmission are equalized.

A relationship between the intensities of the dummy lights and the intensities of the optical signals is described hereinafter. A plurality of the dummy lights with different center wavelengths are inserted into the wavelength-multiplexed optical signal, and each dummy light is controlled so that a total intensity of lights included in a certain band is maintained constant. In this example, a band whose total intensity of lights is maintained constant by one dummy light is referred to as a coverage band of the dummy light.

To clarify the description, "bandwidth" indicates a width defined by a lower limit and an upper limit in a frequency band or a wavelength band, and "band" indicates a range having a predetermined "bandwidth" centering on a predetermined center wavelength in the following description. In other words, "bandwidth" can be defined quantitatively using a numerical value, and "band" is used to identify a range having a predetermined "bandwidth" set at a different position in a frequency band or a wavelength band, such as a first band or a second band, for example.

Figure 5:
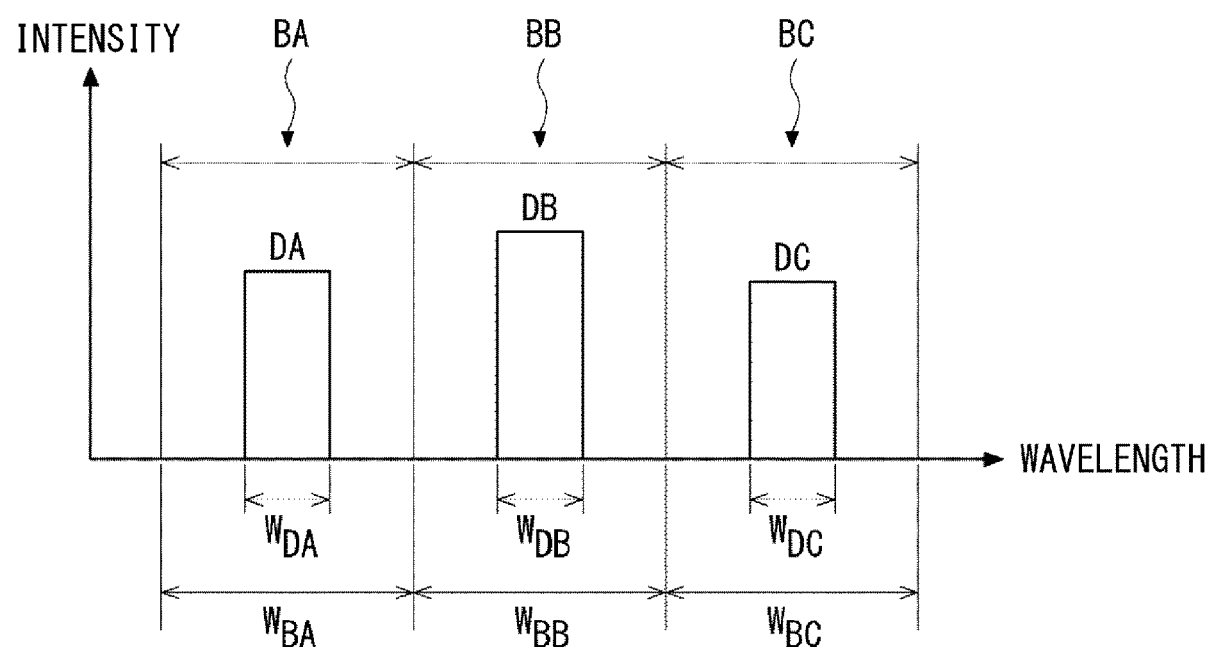
FIG. 5 is a view schematically showing a plurality of dummy lights and coverage bands corresponding thereto.

FIG. 5 schematically shows a plurality of dummy lights and coverage bands corresponding thereto. FIG. 5 shows dummy lights DA to DC with different center wavelengths as an example. In FIG. 5, bandwidths occupied by the dummy lights DA to DC are shown as $W_{DA}$ to $W_{DC}$, respectively. For the dummy lights DA to DC, coverage bands BA to BC respectively including the bandwidths $W_{DA}$ to $W_{DC}$ are set. Note that the range excluding the bandwidths $W_{DA}$ to $W_{DC}$ of the dummy lights DA to DC may be set as the coverage bands BA to BC, respectively. Further, the bandwidths of the coverage bands BA to BC are bandwidths $W_{BA}$ to $W_{BC}$, respectively.

In the bands shown in FIG. 5, when inserting an optical signal into a wavelength-multiplexed optical signal, it is determined which of the coverage bands BA to BC the inserted optical signal belongs to, and thereby a dummy light whose intensity is to be controlled is determined.

When inserting an optical signal into a certain coverage band, the intensity (which is referred to hereinafter as a target value) of the optical signal to be inserted may be determined based on the bandwidth of the coverage band and the intensity of the dummy light when the optical signal is not inserted into the coverage band.

Figure 6:
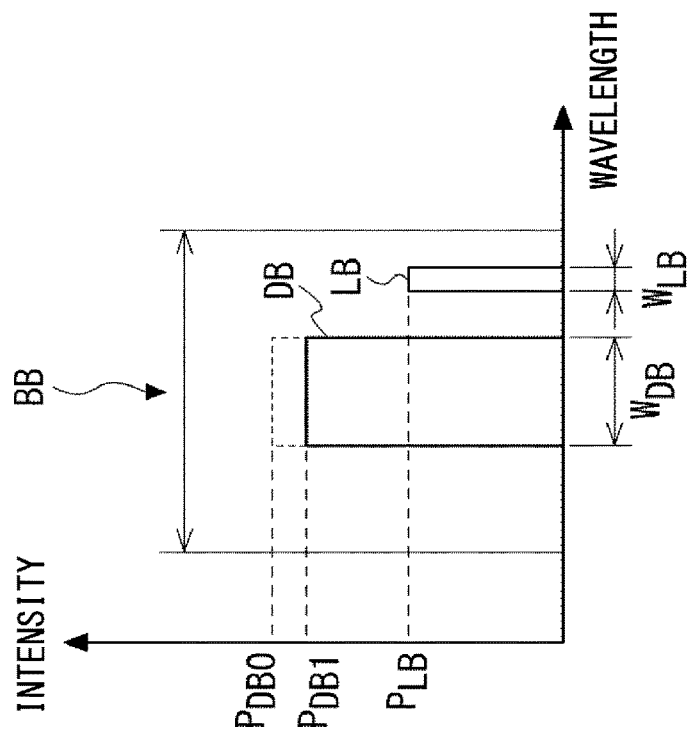
FIG. 6 is a view showing a relationship between an intensity of a dummy light and a target value of an optical signal.
Figure 6:
Figure 6:
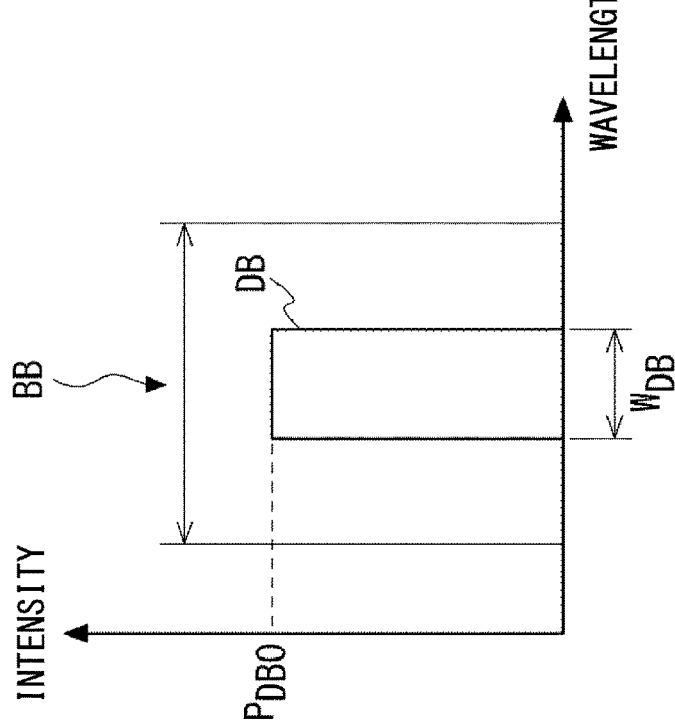

FIG. 6 shows a relationship between the intensity of the dummy light and the target value of the optical signal. The following description focuses on the coverage band BB. In the case where an optical signal is not inserted in the coverage band BB, the intensity of the dummy light DB that is set in consideration of pre-emphasis is $P_{DB0}$ (which is referred to hereinafter as a dummy light intensity initial value). In the case where an optical signal LB having an intensity target value $P_{LB}$ is inserted in the coverage band BB, the intensity of the dummy light DB is controlled so that the total intensity of the lights included in the coverage band BB is maintained constant before and after insertion.

To be specific, when the optical signal LB is inserted, the total intensity of the lights included in the coverage band BB increases by a product of the target value $P_{LB}$ of the optical signal LB and the bandwidth $W_{LB}$ of the optical signal. To cancel out this increase, the intensity of the dummy light DB needs to be decreased. The intensity $P_{DB1}$ of the dummy light DB after insertion of the optical signal is determined to satisfy the following equation [1].

$$P_{LB}W_{LB}+P_{DB1}W_{DB}=P_{DB0}W_{DB} \qquad [1]$$

Therefore, the intensity PDB1 of the dummy light DB after the insertion of the optical signal is represented by the following equation [2].

$$P_{DB1}=P_{DB0}W_{DB}-P_{LB}W_{LB}/W_{DB} \qquad [2]$$

On the other hand, even when removing the optical signal LB that has been already inserted from the coverage band BB, the total intensity of the lights included in the coverage band BB is maintained constant by increasing the intensity of the dummy light from $P_{DB1}$ to $P_{D0}$.

An example of determining the target value $P_{LB}$ of the optical signal LB is described hereinafter. The target value $P_{LB}$ of the optical signal LB may be calculated by averaging, in the coverage band BB, a product of the dummy light intensity initial value $P_{DB0}$ and the bandwidth $W_{DB}$ of the dummy light DB. Specifically, the target value $P_{LB}$ of the intensity of the optical signal may be calculated by dividing the product of the dummy light intensity initial value $P_{DB0}$ and the bandwidth $W_{DB}$ of the dummy light DB by the bandwidth $W_{BB}$ of the coverage band BB.

$$P_{LB} = \frac{P_{DB0}W_{DB}}{W_{BB}} \qquad [3]$$

An example where one optical signal is inserted into or removed from one coverage band has been described above. Note that, however, even when a plurality of optical signals are inserted or removed, the intensity of the dummy light may be increased or decreased for each optical signal to be inserted or removed.

As described above, by controlling the intensity of the corresponding dummy light in accordance with insertion or removal of the optical signal, the total intensity of the lights included in each of the coverage bands of the dummy lights is maintained constant. Further, since the center wavelengths of the dummy light corresponding to the specific coverage band and the optical signal inserted into this coverage band are relatively closer to each other, it is considered that the similar intensity change occurs after transmission. Thus, even when the optical signal is inserted in the specific coverage band, the inverse wavelength dependence with respect to the wavelength dependence due to transmission that is applied to the wavelength-multiplexed optical signal by the pre-emphasis is maintained. Accordingly, the intensities of the optical signals after transmission are equalized.

Figure 7:
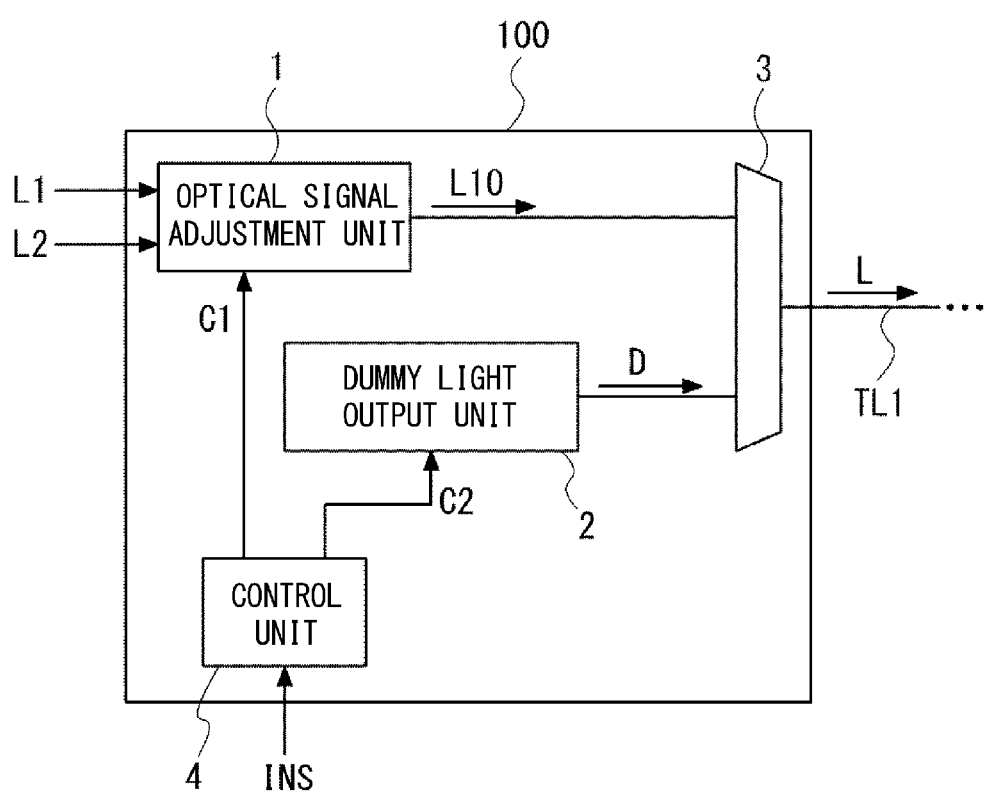
FIG. 7 is a view schematically showing a configuration of the optical transmission apparatus according to the first example embodiment.

The optical transmission apparatus 100 according to the first example embodiment is described hereinafter. FIG. 7 schematically shows a configuration of the optical transmission apparatus 100 according to the first example embodiment. The optical transmission apparatus 100 includes an optical signal adjustment unit 1, a dummy light output unit 2, a multiplexing unit 3, and a control unit 4.

The optical signal adjustment unit 1 is configured to be able to adjust an intensity of each wavelength component included in an input optical signal, and it is configured as a wavelength selective switch (WSS), for example. An optical signal L1 and an optical signal L2 are input to the optical signal adjustment unit 1. The optical signal adjustment unit 1 combines the optical signal L1 and the optical signal L2, adjusts the intensity of each wavelength component included in the combined signal and thereby applies pre-emphasis, and then outputs an adjusted optical signal L10 to the multiplexing unit 3.

The optical signal adjustment unit 1 can separate the wavelength components included in the optical signal L1 and the optical signal L2 and allocate them to different ports, and independently adjust the intensity of the optical signal in each port. An optical attenuator is disposed in each port of the optical signal adjustment unit 1, and the intensity of the optical signal corresponding to each port can be adjusted by controlling the attenuation rate of the optical attenuator.

The dummy light output unit 2 outputs a plurality of dummy lights having different center wavelengths to the multiplexing unit 3. In FIG. 7, the dummy lights output from the dummy light output unit 2 are collectively denoted by the symbol D.

The multiplexing unit 3 combines the optical signal L10 and the dummy light D, and outputs the wavelength-multiplexed optical signal L to the transmission line TL1.

The control unit 4 is configured to control an intensity adjustment operation of the optical signal adjustment unit 1 by providing a control signal C1 and also control the intensity of each wavelength component of the dummy light D to be output from the dummy light output unit 2 by providing a control signal C2. The instruction signal INS indicating pre-emphasis to be applied to the wavelength-multiplexed optical signal L is input from the management server 1001 or the like to the control unit 4. The control unit 4 outputs the control signals C1 and C2 in response to the instruction signal INS.

Figure 8:
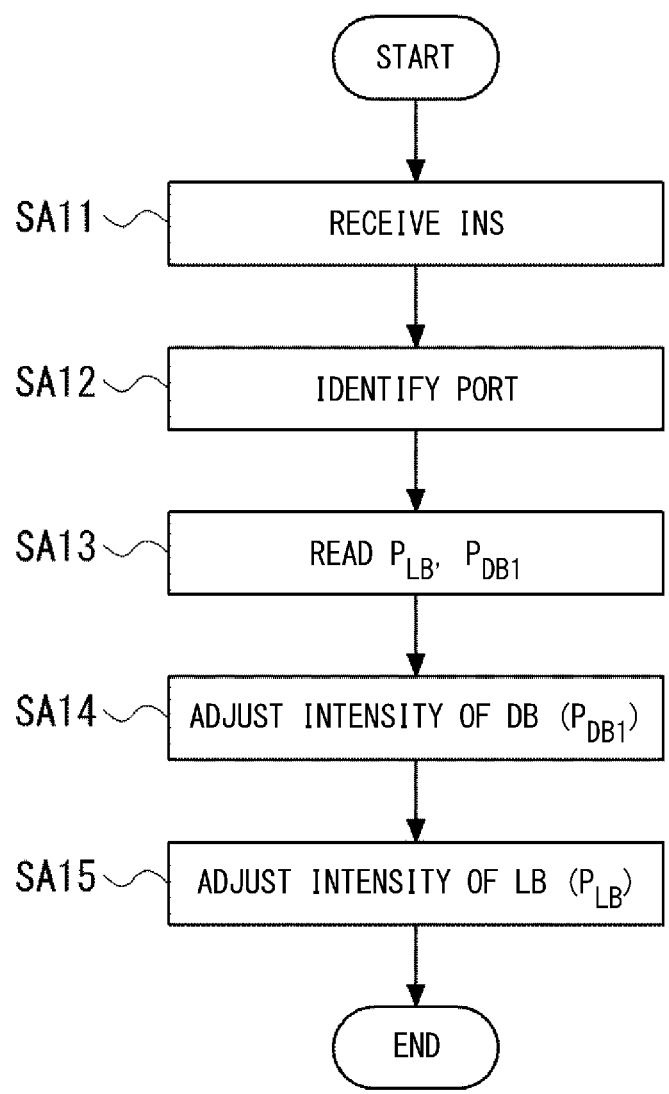
FIG. 8 is a flowchart showing an operation of the optical transmission apparatus in the case where a new optical signal is added.
Figure 9:
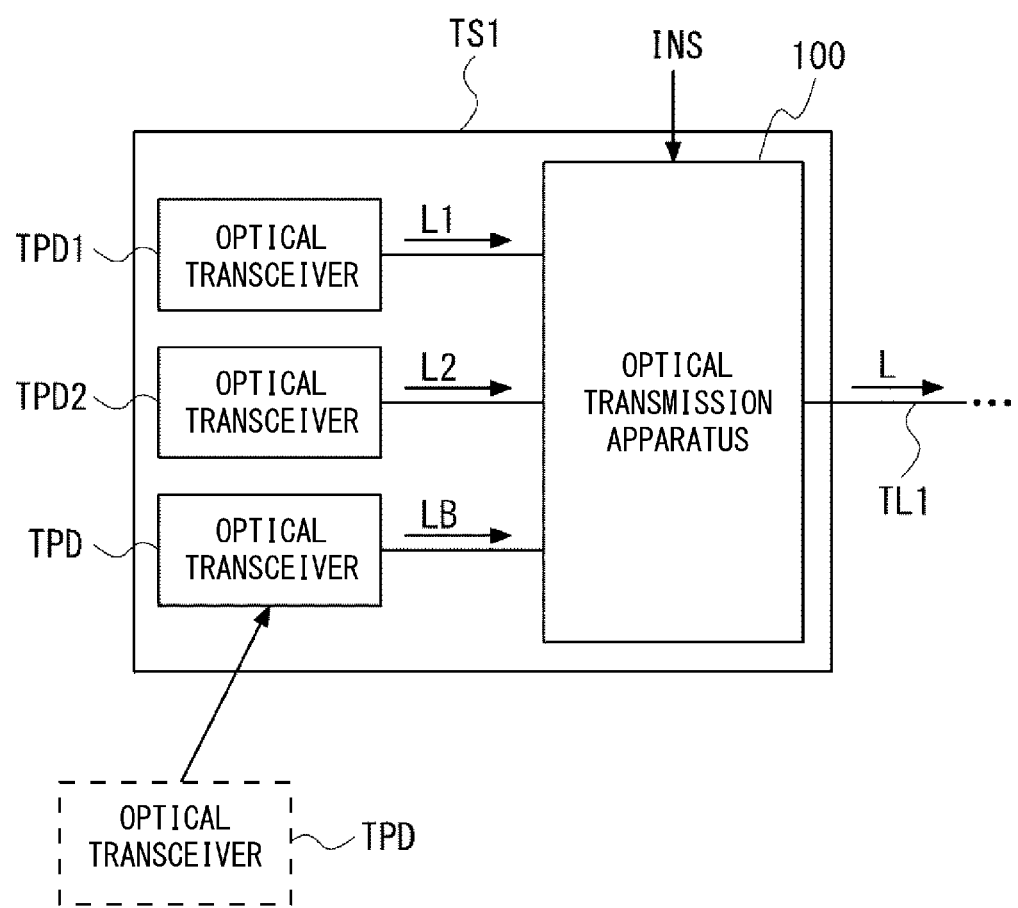
FIG. 9 is a view schematically showing an example in which a new optical transceiver is connected to the terminal station according to the first example embodiment.
Figure 10:
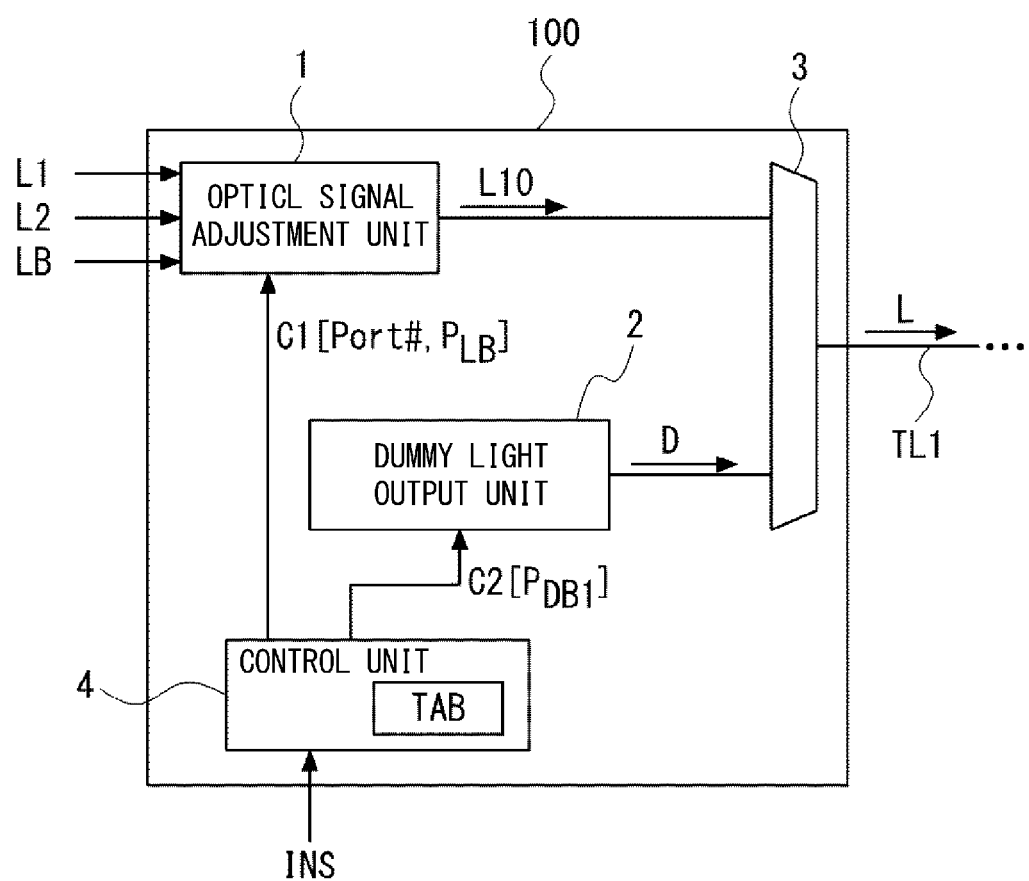
FIG. 10 is a view schematically showing an example in which a new optical signal is input to the optical transmission apparatus of the terminal station according to the first example embodiment.

Next, the operation of the optical transmission apparatus 100 in the case where the new optical signal LB is added to the wavelength-multiplexed optical signal L is described. FIG. 8 is a flowchart showing an operation of the optical transmission apparatus 100 in the case where the optical signal LB is added. FIG. 9 schematically shows an example in which a new optical transceiver TPD is connected to the terminal station TS1 according to the first example embodiment. FIG. 10 schematically shows an example in which the new optical signal LB is input to the optical transmission apparatus 100 of the terminal station TS1 according to the first example embodiment.

In this example, as shown in FIG. 9, the new optical transceiver TPD is connected to the optical transmission apparatus 100 in the terminal station TS1. The optical transceiver TPD outputs the new optical signal LB to the optical transmission apparatus 100.

The management server 1001 outputs the instruction signal INS including information that notifies the optical transmission apparatus 100 of addition of the new optical transceiver TPD. This instruction signal INS includes at least information indicating the center wavelength of the optical signal LB output from the added optical transceiver TPD.

Step SA11

The control unit 4 receives the instruction signal INS.

Step SA12

The control unit 4 identifies a port of the optical signal adjustment unit 1 which corresponds to the center wavelength of the optical signal LB to be inserted by referring to a table TAB stored therein.

Step SA13

The control unit 4 reads the target value $P_{LB}$ of the optical signal LB by referring to the table TAB. Further, the control unit 4 identifies the dummy light DB corresponding to the optical signal LB by referring to the table TAB. The control unit 4 reads the set value $P_{DB1}$ of the intensity of the dummy light DB after insertion of the optical signal.

Step SA14

The control unit 4 outputs the control signal C1 to the optical signal adjustment unit 1 in order to adjust the intensity of the added optical signal LB to the target value $P_{LB}$. In response to the control signal C1, the optical signal adjustment unit 1 first maximizes the attenuation rate of the optical signal LB at the identified port. This prevents the optical signal LB with an unintended intensity from being erroneously output when the optical signal LB is inserted. After that, the optical signal adjustment unit 1 adjusts the attenuation rate at the identified port and thereby adjusts the intensity of the optical signal LB to the target value $P_{LB}$.

Step SA15

The control unit 4 outputs the control signal C2 to the dummy light output unit 2 in order to adjust the intensity of the dummy light DB corresponding to the optical signal LB to $P_{DB1}$. In response to the control signal C2, the dummy light output unit 2 adjusts the intensity of the dummy light DB from $P_{DB0}$ to $P_{DB1}$ as shown in FIG. 6.

As described above, according to the operation shown in FIG. 8, the intensity of the inserted optical signal can be adjusted to an appropriate value and the intensity of the corresponding dummy light can be also adjusted to an appropriate value. Thus, it is possible to maintain the total intensity of the lights in the coverage band where the optical signal is inserted and apply the wavelength dependence that cancels out the wavelength dependence occurring due to transmission to the wavelength-multiplexed optical signal.

Figure 11:
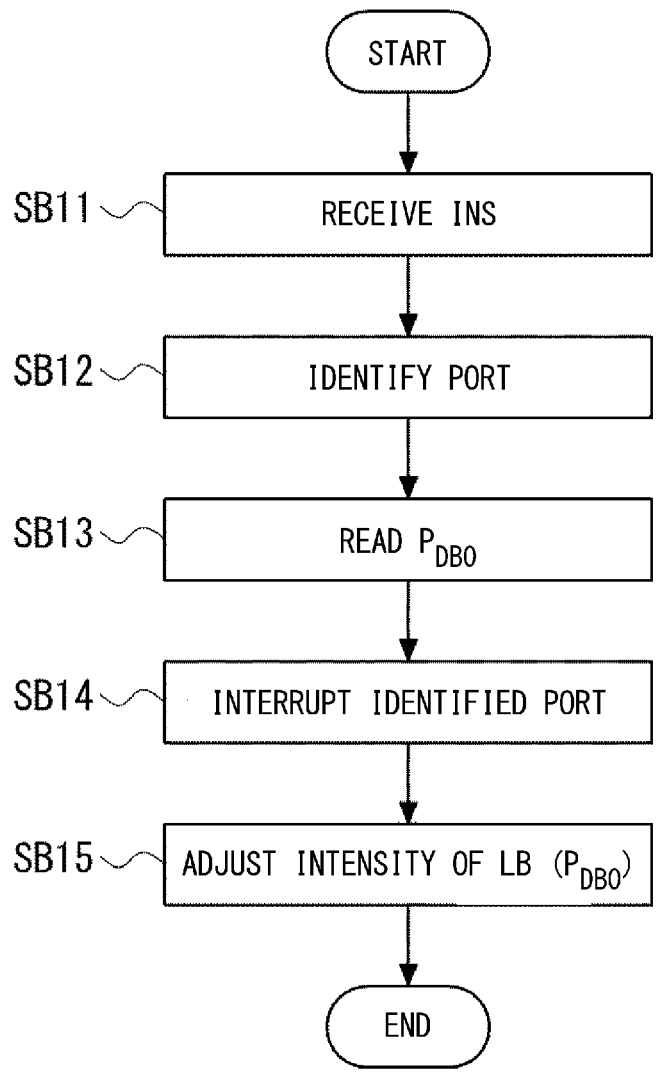
FIG. 11 is a flowchart showing an operation of the optical transmission apparatus in the case where an optical signal is removed from a coverage band.

The case where the optical signal LB is removed from the coverage band BB is described hereinafter. FIG. 11 is a flowchart showing an operation of the optical transmission apparatus 100 in the case where the optical signal LB is removed from the coverage band BB.

In this example, the optical transceiver TPD shown in FIG. 9 is removed from the optical transmission apparatus 100. Thus, input of the optical signal LB to the optical transmission apparatus 100 is interrupted.

The management server 1001 outputs the instruction signal INS including information that notifies the optical transmission apparatus 100 of removal of the optical transceiver TPD from the optical transmission apparatus 100. This instruction signal INS includes at least information indicating the center wavelength of the optical signal LB to be interrupted.

Step SB11

The control unit 4 receives the instruction signal INS.

Step SB12

The control unit 4 identifies a port of the optical signal adjustment unit 1 which corresponds to the wavelength of the optical signal LB to be interrupted by referring to the table TAB.

Step SB13

The control unit 4 reads the intensity initial value $P_{DB0}$ of the dummy light DB to be used after interruption of the optical signal LB by referring to the table TAB.

Step SB14

The control unit 4 outputs the control signal C1 to the optical signal adjustment unit 1 to interrupt the optical signal LB. In response to the control signal C1, the optical signal adjustment unit 1 maximizes the attenuation rate of the optical signal LB at the identified port. The optical signal LB is thereby interrupted.

Step SB15

Figure 12:
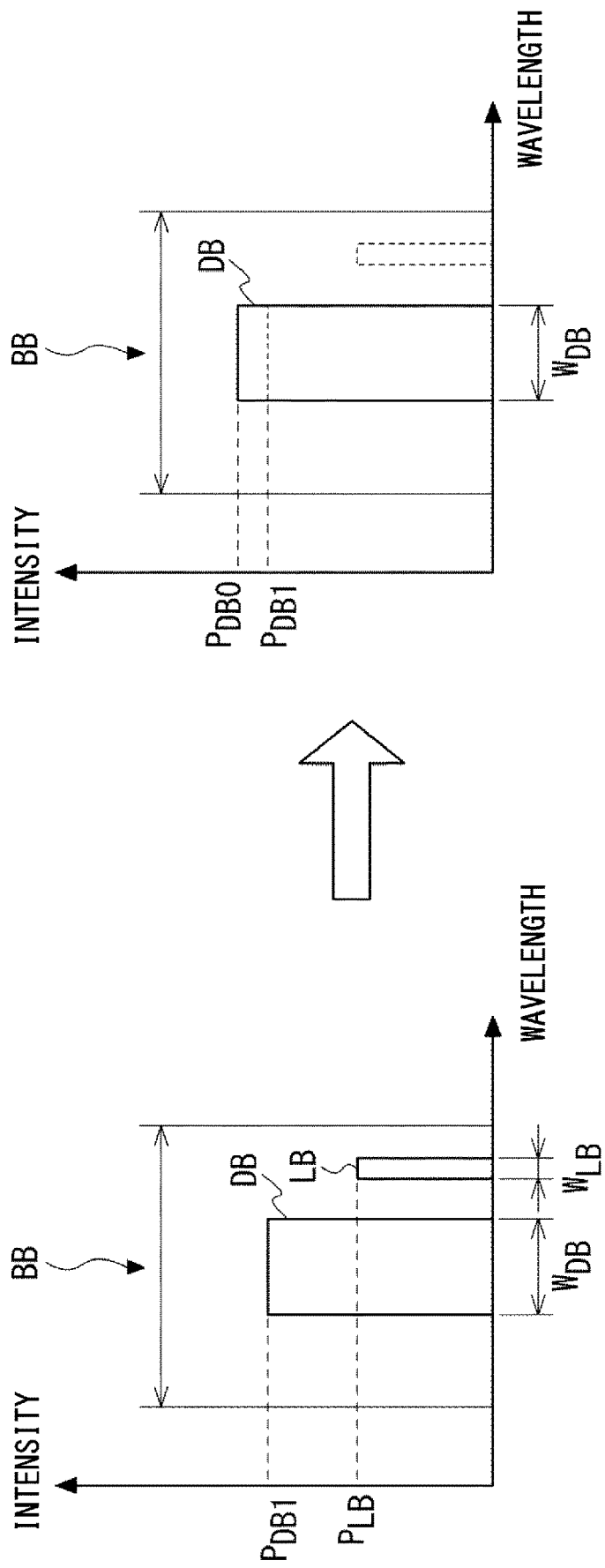
FIG. 12 is a view showing an intensity of a dummy light in the case where an optical signal is removed.

The control unit 4 outputs the control signal C2 to the dummy light output unit 2 in order to adjust the intensity of the dummy light DB. FIG. 12 shows the intensity of the dummy light DB in the case where the optical signal LB is removed. In response to the control signal C2, the dummy light output unit 2 increases the intensity of the dummy light DB from $P_{DB1}$ to $P_{DB0}$ as shown in FIG. 12.

As described above, according to the operation shown in FIG. 11, the intensity of the corresponding dummy light can be increase by an appropriate value when interrupting the optical signal with a certain wavelength. Thus, it is possible to compensate for a decrease in the intensity of the optical signal when the optical signal is interrupted by increasing the intensity of the dummy light and apply the wavelength dependence that cancels out the wavelength dependence occurring due to transmission to the wavelength-multiplexed optical signal.

Second Example Embodiment

Figure 13:
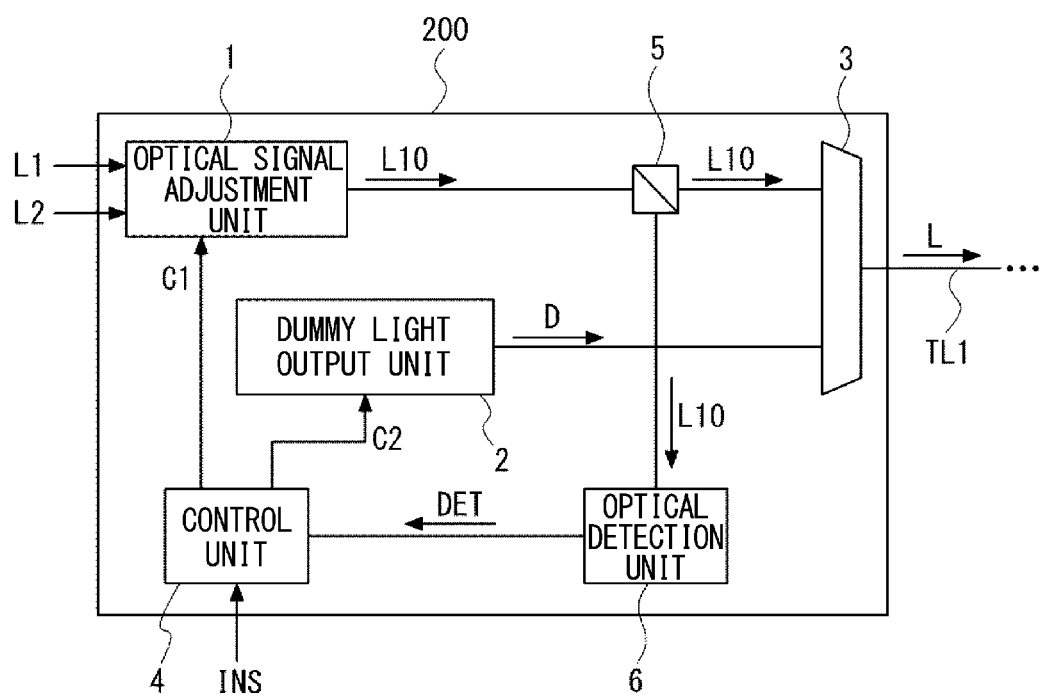
FIG. 13 is a view schematically showing a configuration of an optical transmission apparatus according to a second example embodiment.

An optical transmission apparatus 200 according to a second example embodiment is described hereinafter. FIG. 13 schematically shows a configuration of the optical transmission apparatus 200 according to the second example embodiment. The optical transmission apparatus 200 has a configuration in which a demultiplexer 5 and a photodetector 6 are added to the optical transmission apparatus 100 according to the first example embodiment.

The demultiplexer 5 branches a part of the optical signal L10 that is output from the optical signal adjustment unit 1, and outputs the branched part of the optical signal L10 to the photodetector 6.

The photodetector 6 is configured to be able to detect the intensity of each of the optical signals with a plurality of wavelengths included in the optical signal L10 output from the optical signal adjustment unit 1.

The other configuration of the optical transmission apparatus 200 is the same as that of the optical transmission apparatus 100, and the description thereof is omitted.

Figure 14:
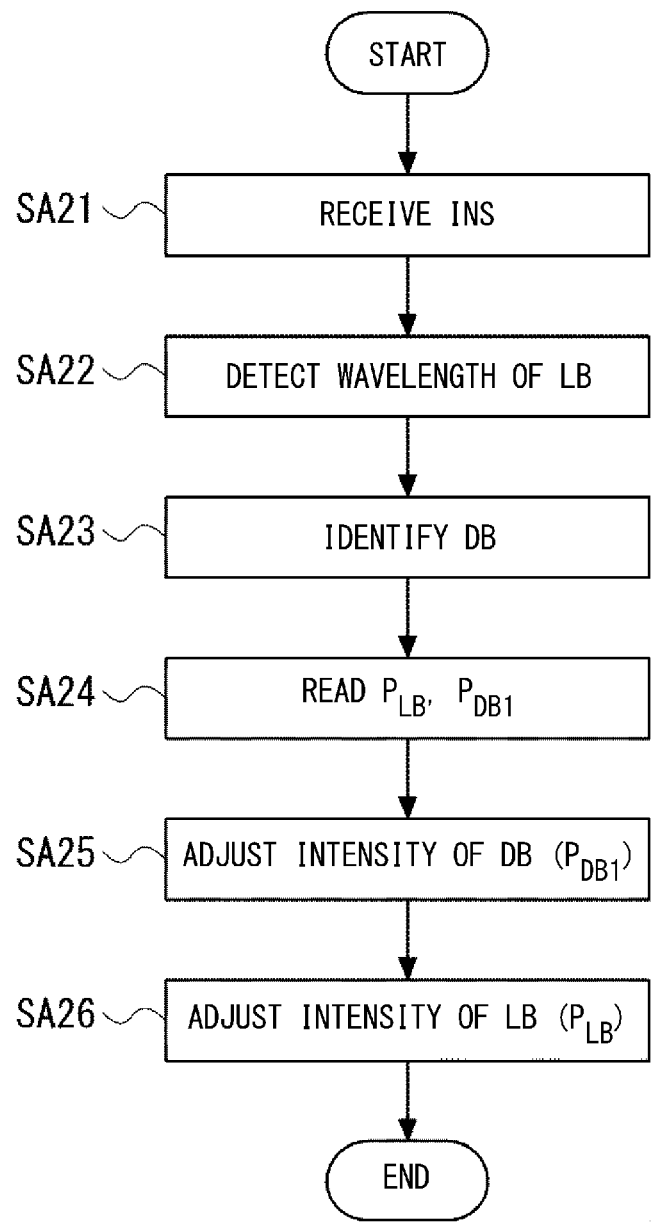
FIG. 14 is a flowchart showing an operation of the optical transmission apparatus in the case where a new optical signal is inserted.

Next, an operation of the optical transmission apparatus 200 in the case where the new optical signal LB is inserted into the wavelength-multiplexed optical signal L is described. FIG. 14 is a flowchart showing the operation of the optical transmission apparatus 200 in the case where the new optical signal LB is inserted.

In this example, as in the first example embodiment, the new optical transceiver TPD is connected to the optical transmission apparatus 200 in the terminal station TS1. The new optical transceiver TPD outputs the new optical signal LB to the optical transmission apparatus 100.

The management server 1001 outputs the instruction signal INS including information that notifies the optical transmission apparatus 200 of addition of the optical transceiver TPD. This instruction signal INS includes at least information indicating port information of the optical signal adjustment unit 1 corresponding to the optical signal LB.

Step SA21

The control unit 4 receives the instruction signal INS. The control unit 4 thereby recognizes that the new optical signal LB is inserted into the identified port.

Step SA22

Although the port of the optical signal adjustment unit 1 to which the inserted optical signal LB is input has the maximum attenuation rate at this time, the optical signal LB is not completely interrupted even when the attenuation rate is the maximum. Therefore, a part of the optical signal leaks though its intensity is low. Thus, when the optical signal LB is input to the optical signal adjustment unit 1, the photodetector 6 can detect the optical signal LB that leaks from the optical signal adjustment unit 1. In this case, the photodetector 6 detects the wavelength of the optical signal LB, and outputs a detection signal DET indicating a detection result to the control unit 4.

Step SA23

The control unit 4 identifies the wavelength of the optical signal LB based on the detection signal DET, and thereby identifies the corresponding dummy light DB and the coverage band BB by referring to the table TAB.

Steps SA24 to SA26

Steps SA24 to SA26 are the same as the steps SA13 to SA15 in FIG. 8, respectively, and the description thereof is omitted.

As described above, according to the operation shown in FIG. 14, the intensity of the inserted optical signal can be adjusted to an appropriate value and the intensity of the corresponding dummy light can be also adjusted to an appropriate value as in the first example embodiment. Thus, it is possible to maintain the total intensity of the lights included in the coverage band where the optical signal is inserted and apply the wavelength dependence that cancels out the wavelength dependence occurring due to transmission to the wavelength-multiplexed optical signal.

Figure 15:
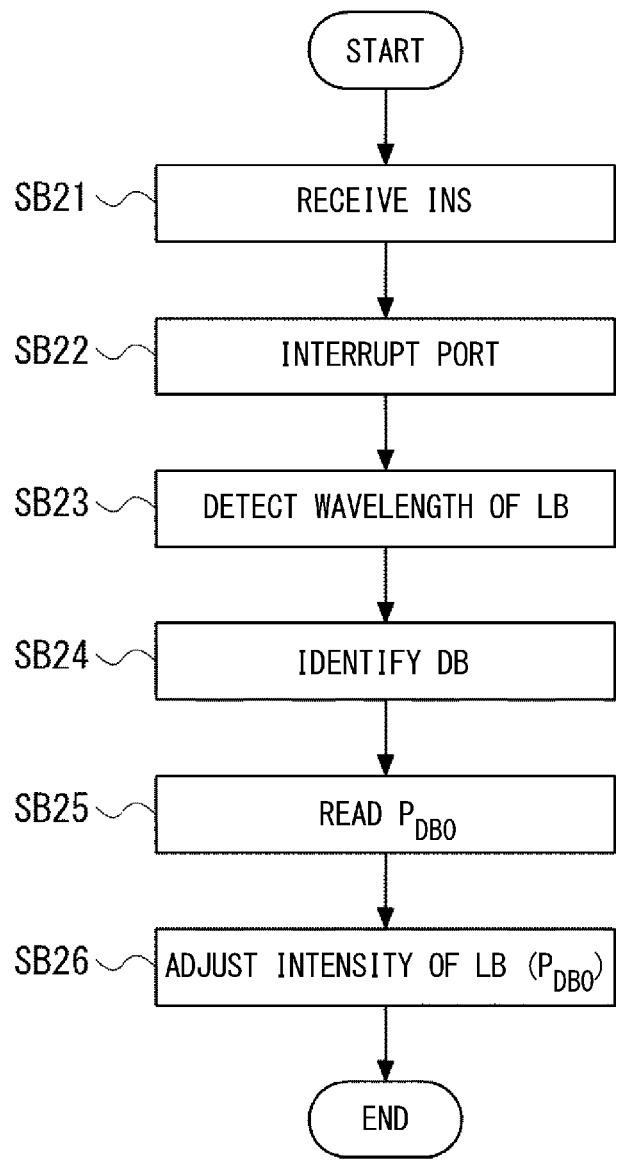
FIG. 15 is a flowchart showing an operation of the optical transmission apparatus in the case where an optical signal is removed from a wavelength-multiplexed optical signal.

Next, an operation of the optical transmission apparatus 200 in the case where the optical signal LB is removed from the wavelength-multiplexed optical signal L is described. FIG. 15 is a flowchart showing the operation of the optical transmission apparatus 200 in the case where the optical signal LB is removed from the wavelength-multiplexed optical signal L.

In this example, as in the first example embodiment, the optical transceiver TPD is removed from the optical transmission apparatus 200, and thereby input of the optical signal LB to the optical transmission apparatus 200 is interrupted.

The management server 1001 outputs the instruction signal INS including information that notifies the optical transmission apparatus 200 of removal of the optical transceiver TPD from the optical transmission apparatus 200.

Step SB21

The control unit 4 receives the instruction signal INS. The control unit 4 thereby recognizes that the optical signal LB is removed from the identified port.

Step SB22

The control unit 4 outputs the control signal C1 to the optical signal adjustment unit 1 to cause the optical signal adjustment unit 1 to interrupt the optical signal LB. In response to the control signal C1, the optical signal adjustment unit 1 maximizes the attenuation rate of the optical signal LB at the identified port.

Step SB23

The photodetector 6 detects the wavelength of the optical signal whose intensity has changed greater than a predetermined threshold and thereby detects the wavelength of the optical signal LB. The photodetector 6 outputs the detection signal DET indicating the wavelength of the optical signal LB to the control unit 4.

Step SB24

The control unit 4 identifies the wavelength of the optical signal LB based on the detection signal DET. The control unit 4 then identifies the dummy light DB corresponding to the wavelength of the optical signal LB by referring to the table TAB.

Steps SB25 and SB26

Steps SB25 and SB26 are the same as the steps SB13 and SB15 in FIG. 12, respectively, and the description thereof is omitted.

As described above, according to the operation shown in FIG. 15, the intensity of the corresponding dummy light can be adjusted to an appropriate value when interrupting the optical signal with a certain wavelength as in the first example embodiment. Thus, it is possible to compensate for a decrease in the intensity of the optical signal when the optical signal is interrupted by increasing the intensity of the dummy light and apply the wavelength dependence that cancels out the wavelength dependence occurring due to transmission to the wavelength-multiplexed optical signal.

Third Example Embodiment

An optical transmission apparatus according to a third example embodiment is described hereinafter. In the third example embodiment, an operation of the optical transmission apparatus in the case where the optical signal LB to be inserted and the corresponding dummy light DB overlap is described. Note that a configuration of the optical transmission apparatus according to the third example embodiment is the same as that of the optical transmission apparatus 100 according to the first example embodiment, and thereby the description thereof is omitted.

Figure 16:
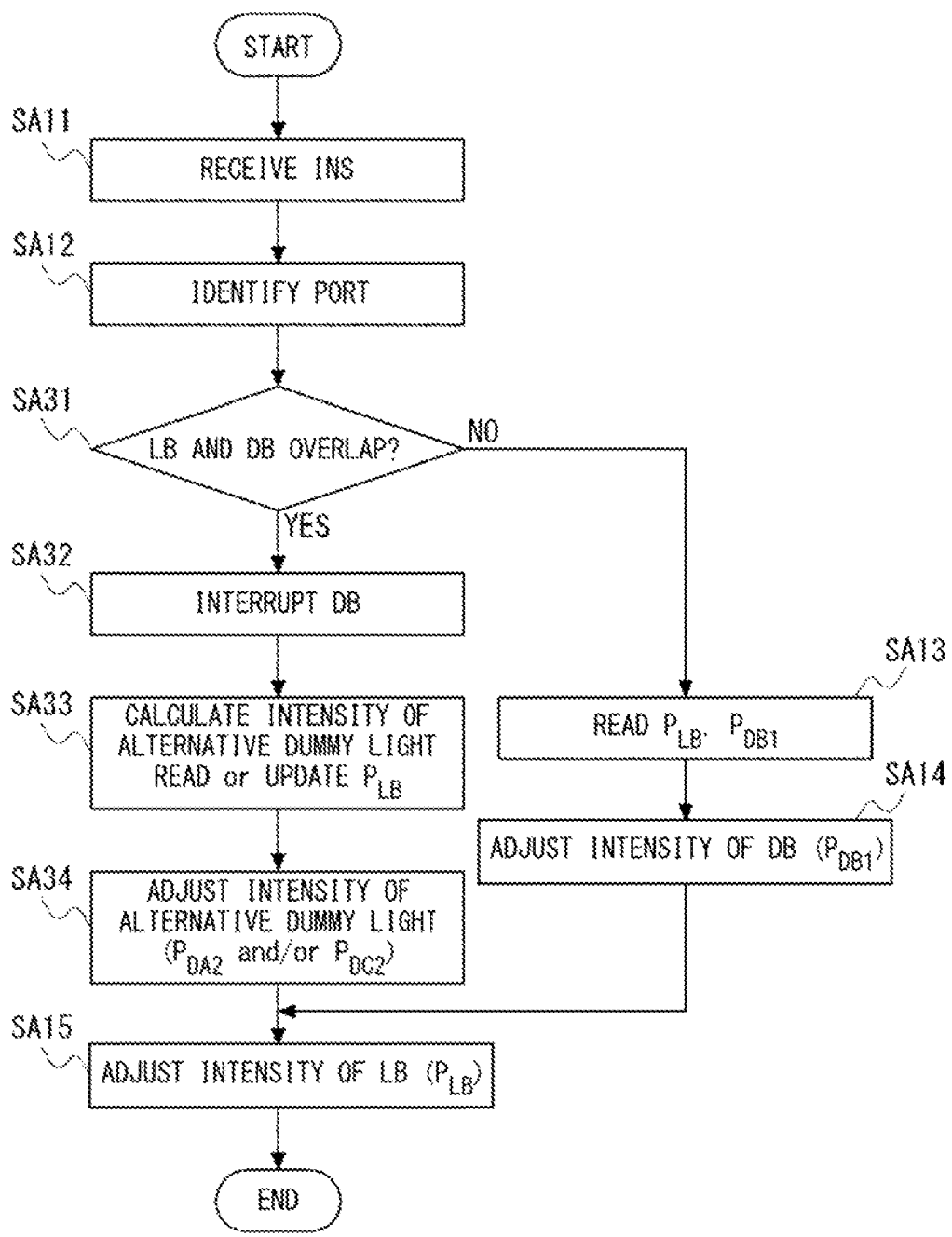
FIG. 16 is a flowchart showing an operation in the case where a new optical signal is added to an optical transmission apparatus according to a third example embodiment.

An operation of the optical transmission apparatus according to the third example embodiment is described hereinafter. FIG. 16 is a flowchart showing the operation in the case where the optical signal LB is added to the optical transmission apparatus according to the third example embodiment.

As in the first example embodiment, the management server 1001 outputs the instruction signal INS including information that notifies the optical transmission apparatus 300 of addition of the new optical transceiver TPD. This instruction signal INS includes at least information indicating the center wavelength of the optical signal LB.

Steps SA11 to SA15 in FIG. 16 are the same as in FIG. 12, and therefore the description thereof is omitted. Steps SA31 to SA34 added in FIG. 16 are described hereinbelow.

Step SA31

Figure 17:
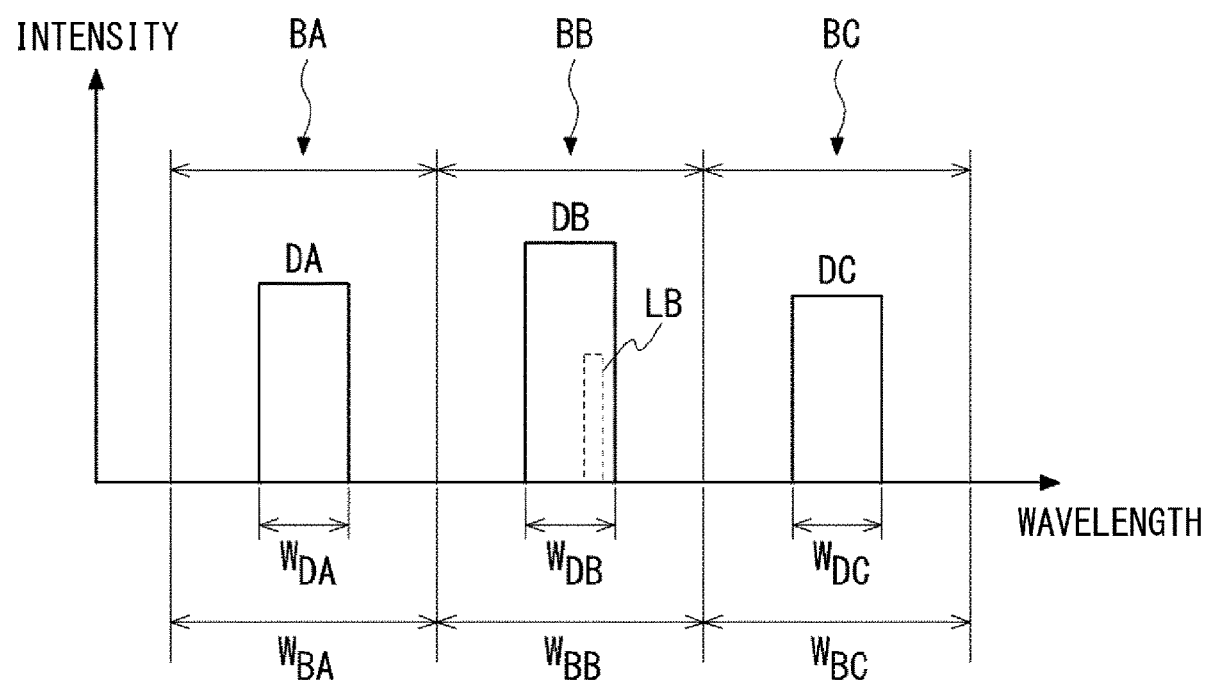
FIG. 17 is a view showing the case where an optical signal and a band occupied by a dummy light overlap.

The control unit 4 determines whether the optical signal LB and the band occupied by the dummy light DB overlap. FIG. 17 shows the case where the optical signal LB and the band occupied by the dummy light DB overlap.

Step SA32

When the optical signal LB and the band occupied by the dummy light DB overlap, it is necessary to prevent the optical signal LB from being buried in the dummy light DB. Thus, the control unit 4 outputs the control signal C2 to the dummy light output unit 2 to interrupt the output of the dummy light DB. In response to the control signal C2, the dummy light output unit 2 stops outputting of the dummy light DB.

Step SA33

As a result, the dummy light DB does not exist in the coverage band BB of the dummy light DB. Therefore, in this example embodiment, alternative processing in which compensation by the dummy light DB in the coverage band BB is carried out by another coverage band is performed.

Figure 18:
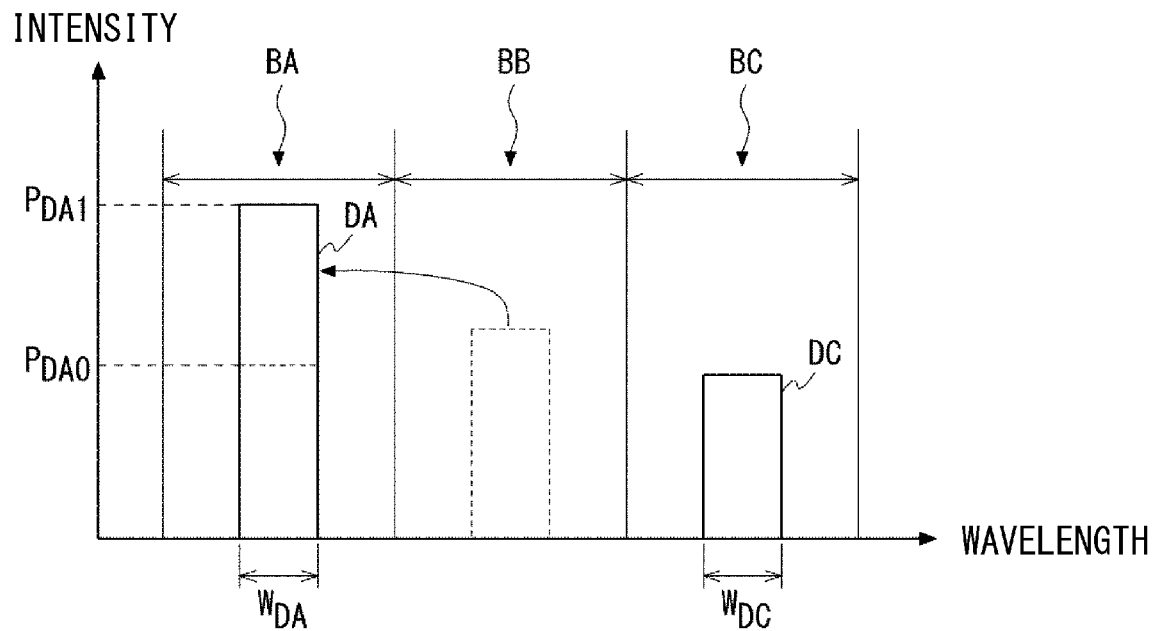
FIG. 18 is a view showing an optical signal and dummy lights in the case where a compensation function by a dummy light in a coverage band is alternatively carried out by one adjacent coverage band.
Figure 18:
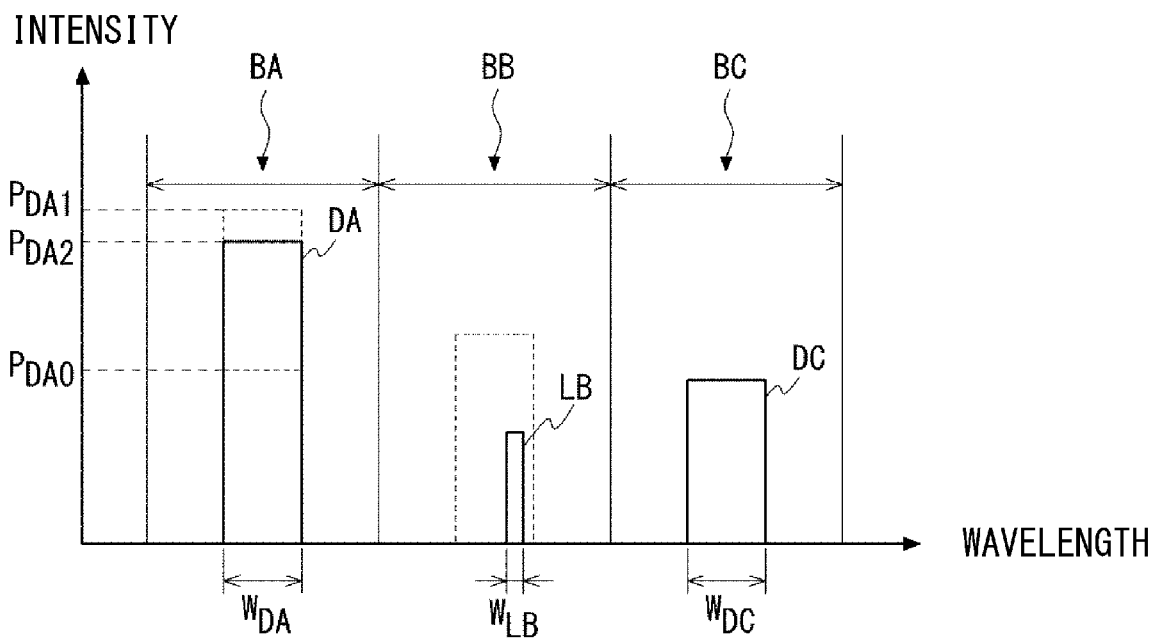

The case where a compensation function by the dummy light DB in the coverage band BB is alternatively carried out by one adjacent coverage band BA is described first. FIG. 18 shows an optical signal and dummy lights in the case where the compensation function by the dummy light DB in the coverage band BB is alternatively carried out by the coverage band BA. In this example, the dummy light intensity initial value of the coverage band BA before the alternative processing is $P_{DA0}$. In this case, the dummy light intensity initial value of the coverage band BA after the alternative processing needs to be increased to be greater than $P_{DA0}$.

In this case, the total intensity of the lights in the coverage bands BA and BB needs to be constant before and after the alternative processing. Thus, the intensity initial value $P_{DA1}$ of the dummy light in the coverage band BA after the alternative processing is represented by the following equation.

$$P_{DB0}W_{DB} + P_{DA0}W_{DA} = P_{DA1}W_{DA} \qquad [4]$$

$$P_{DA1} = \frac{(P_{DB0}W_{DB} + P_{DA0}W_{DA})}{W_{DA}} \qquad [5]$$

Then, the control unit 4 reads the target value $P_{LB}$ of the optical signal LB by referring to the table TAB. At this time, the control unit 4 may update the target value $P_{LB}$ of the optical signal LB to be inserted to a value obtained by the following equation [6], just like the equation [1].

$$P_{LB} = \frac{P_{DA1}W_{DA}}{W_{BB} + W_{BA}} \qquad [6]$$

The control unit 4 can determine the intensity $P_{DA2}$ of a dummy light DA after insertion of the optical signal according to the target value $P_{LB}$ of the optical signal LB as in the expression [3].

$$P_{DA2} = \frac{P_{DA1}W_{DA} - P_{LB}W_{LB}}{W_{DA}} \qquad [7]$$

Figure 19:
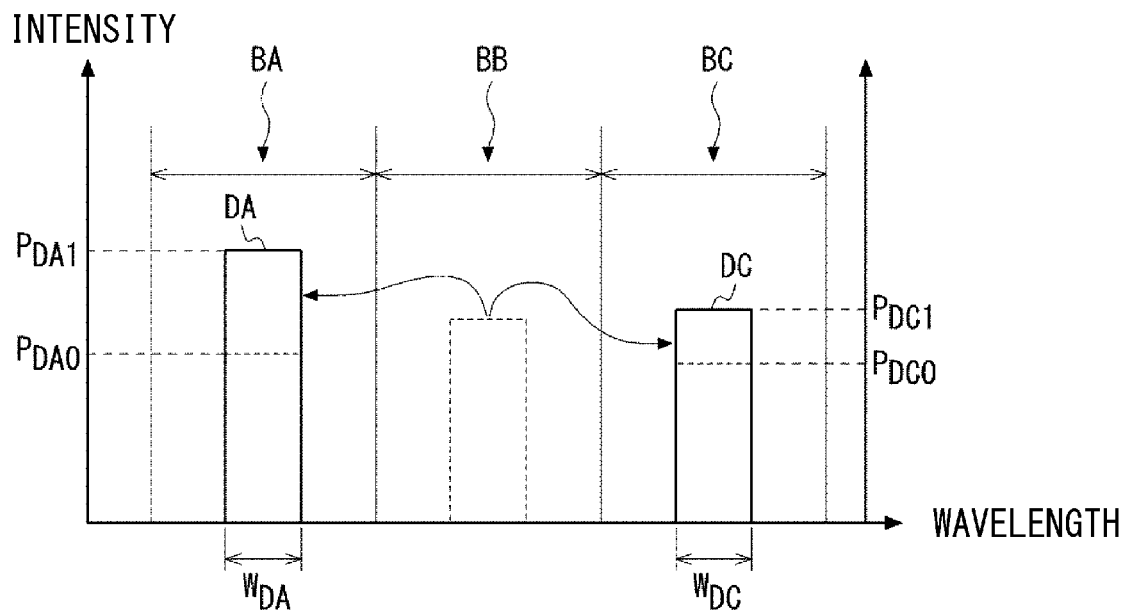
FIG. 19 is a view showing an optical signal and dummy lights in the case where a compensation function by a dummy light in a coverage band is alternatively carried out by two adjacent coverage bands.
Figure 19:
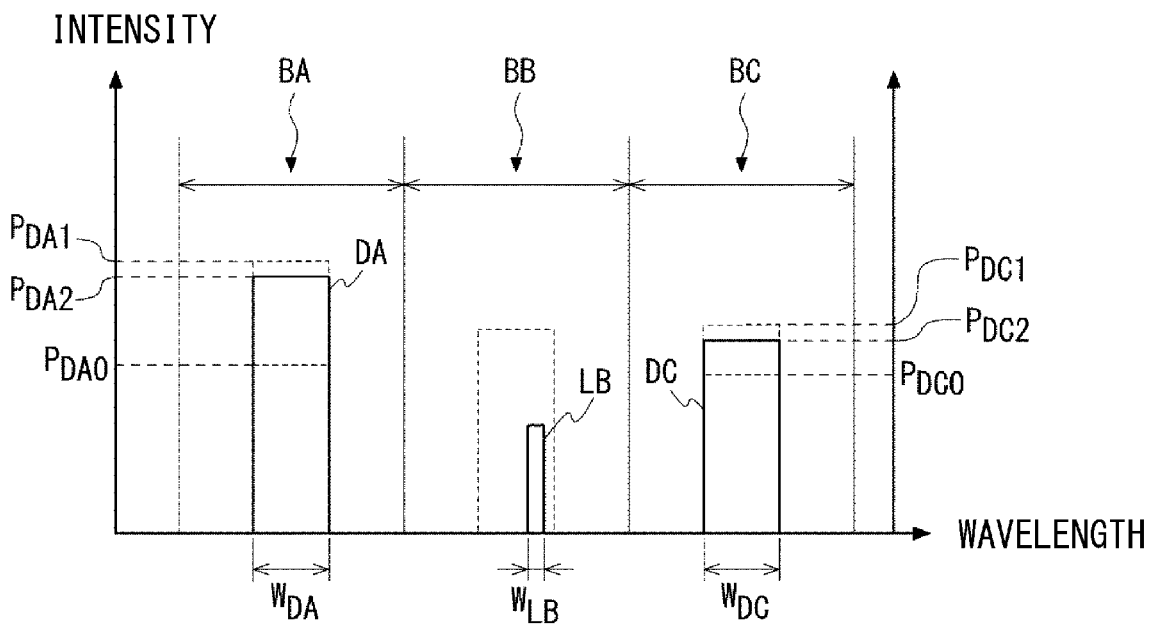

Next, the case where a compensation function by the dummy light DB in the coverage band BB is alternatively carried out by two adjacent coverage bands BA and BC is described next. FIG. 19 shows an optical signal and dummy lights in the case where the compensation function by the dummy light DB in the coverage band BB is alternatively carried out by the coverage bands BA and BC. In this example, the dummy light intensity initial value of a dummy light DC before the alternative processing is $P_{DC0}$. In this case, the dummy light intensity initial values of the coverage bands BA and BC after the alternative processing need to be increased to be greater than $P_{DA0}$ and $P_{DC0}$, respectively.

In this case, the total intensity of the lights included in the coverage bands BA and BC needs to be constant before and after the alternative processing. Thus, the intensity initial values $P_{DA1}$ and $P_{DC1}$ of the dummy lights in the coverage bands BA and BC after the alternative processing are determined to satisfy the following equation.

$$P_{DB0}W_{DB}+P_{DA0}W_{DA}+P_{DC0}W_{DC}=P_{DA1}W_{DA}+PD_{DC1}W_{DC} \quad [8]$$

Note that the intensity initial values $P_{DA1}$ and $P_{DC1}$ of the dummy lights in the coverage bands BA and BC after the alternative processing may be determined to satisfy the following relationship, in consideration of the intensity initial values before the alternative processing.

$$P_{DA1}:P_{DC1} = P_{DA0}:P_{DC0} \quad [9]$$

$$P_{DA1} = \frac{P_{DA0}}{P_{DC0}} \cdot P_{DC1} \quad [10]$$

The control unit 4 then reads the target value $P_{LB}$ of the optical signal LB by referring to the table TAB. At this time, the control unit 4 may update the target value $P_{LB}$ of the optical signal LB to a value obtained by the following equation [11], just like the equation [1].

$$P_{LB} = \frac{P_{DA1}W_{DA} + P_{DC1}W_{DC}}{W_{BB} + W_{BA} + W_{BC}} \quad [11]$$

Further, the control unit 4 may update the target value $P_{LB}$ of the optical signal LB to a value obtained by the following equation [12].

$$P_{LB} = \frac{P_{LA} + P_{LB}}{2} \quad [12]$$

The control unit 4 can determine the intensities $P_{DA2}$ and $P_{DC2}$ of the dummy lights DA and DC after insertion of the optical signal according to the target value $P_{LB}$ of the optical signal LB. At this time, the intensities $P_{DA2}$ and $P_{DC2}$ of the dummy lights DA and DC after the insertion of the optical signal may be determined on based on the following equation, in consideration of the intensity initial values before the alternative processing.

$$P_{DA2} = \frac{P_{DA1}W_{DA} - \frac{P_{DA0}}{P_{DC0}} \cdot P_{LB}W_{LB}}{W_{DA}} \quad [13]$$

$$P_{DC2} = \frac{P_{DC1}W_{DC} - \frac{P_{DC0}}{P_{DA0}} \cdot P_{LB}W_{LB}}{W_{DC}} \quad [14]$$

Note that, after the output of the dummy light DB is stopped, the coverage band BB may be deleted and a part of the coverage band BB may be allocated to the coverage bands BA and BC. In other words, the coverage bands BA and BC may be enlarged. When the entire band of the dummy light DB whose output is stopped is included in the enlarged coverage band BA, the intensity initial value of the dummy light DA may be increased.

Further, there can be a case where the band of the dummy light DB whose output is stopped is included in the enlarged coverage bands BA and BC. In this case, increased amounts of the dummy light intensity initial values of the coverage bands BA and BC after the alternative processing may be set according to the amount of the band of the dummy light DB included in each of the coverage bands BA and BC. For example, when the band of the dummy light DB included in the coverage band BC is wider than the band of the dummy light DB included in the coverage band BA, an increased amount of the dummy light intensity initial value of the dummy light DC may be set to be greater than an increased amount of the dummy light intensity initial value of the dummy light DA.

Step SA34

The control unit 4 outputs the control signal C2 to the dummy light output unit 2 to control the intensity of the alternative dummy light. In response to the control signal C2, the dummy light output unit 2 adjusts the intensity of the alternative dummy light to the calculated value.

As described above, in accordance with the optical transmission apparatus according to this example embodiment, even when the wavelength of the inserted optical signal overlaps the band of the corresponding dummy light, the overlapping dummy light can be interrupted and be replaced with a dummy light in another coverage band. Thus, it is possible to maintain the total intensity of the lights in the band covered by the alternative dummy light when the optical signal is inserted and apply the wavelength dependence that cancels out the wavelength dependence occurring due to transmission to the wavelength-multiplexed optical signal.

Fourth Example Embodiment

An optical transmission apparatus according to a fourth example embodiment is described hereinafter. In the fourth example embodiment, an operation of the optical transmission apparatus in the case where an optical signal LB to be inserted overlaps two coverage bands is described. Note that a configuration of the optical transmission apparatus according to the fourth example embodiment is the same as that of the optical transmission apparatus 100 according to the first example embodiment, and therefore the description thereof is omitted.

Figure 20:
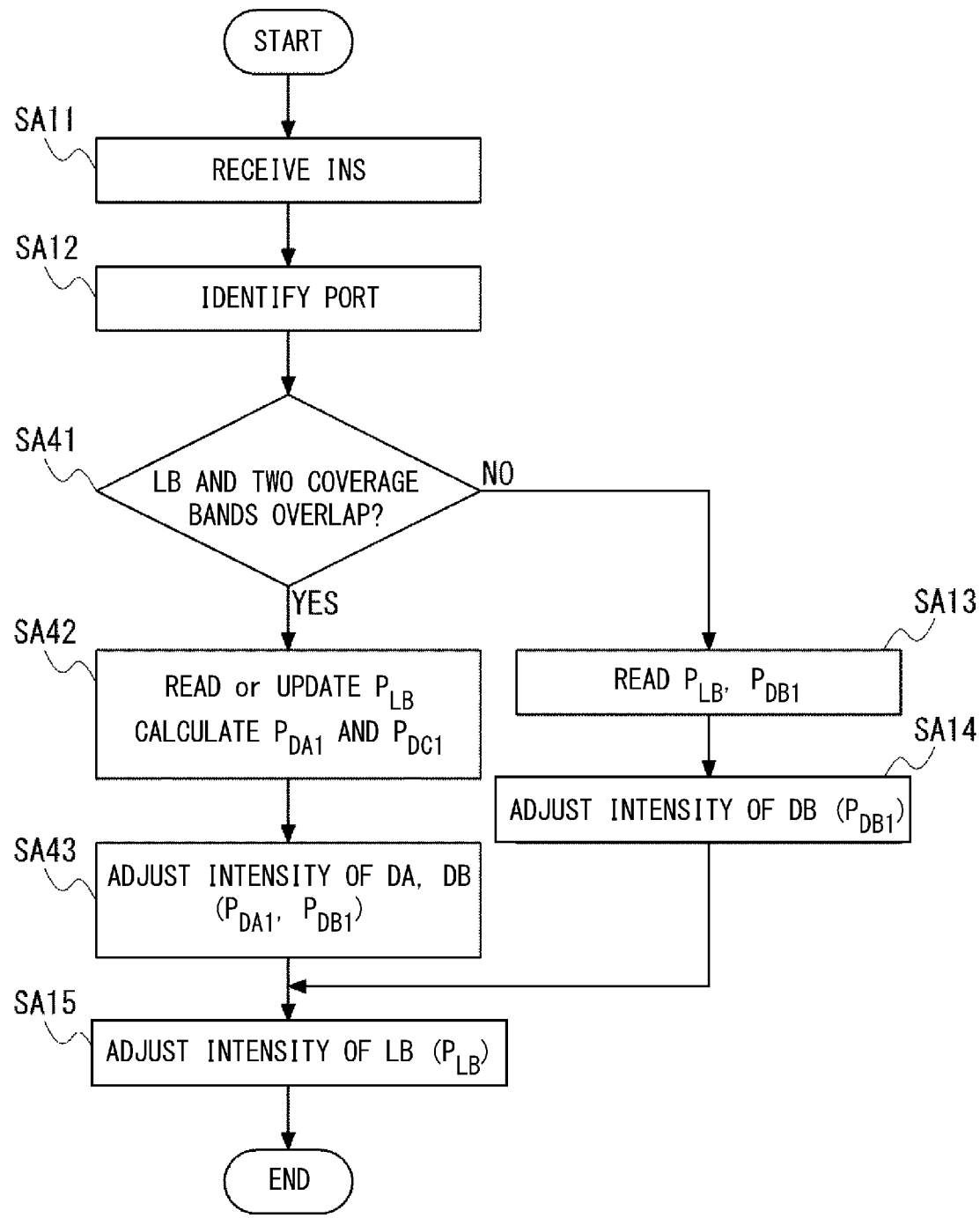
FIG. 20 is a flowchart showing an operation in the case where a new optical signal is added to an optical transmission apparatus according to a fourth example embodiment.

The operation of the optical transmission apparatus according to the fourth example embodiment is described hereinafter. FIG. 20 is a flowchart showing the operation in the case where the optical signal LB is added to the optical transmission apparatus according to the fourth example embodiment.

As in the first example embodiment, the management server 1001 outputs the instruction signal INS including information that notifies the optical transmission apparatus 400 of addition of the new optical transceiver TPD. This instruction signal INS includes information indicating the center wavelength of the optical signal LB.

The steps SA11 to SA15 in FIG. 20 are the same as in FIG. 8, and therefore the description thereof is omitted. Steps SA41 to SA43 added in FIG. 20 are described hereinbelow.

Step SA41

Figure 21:
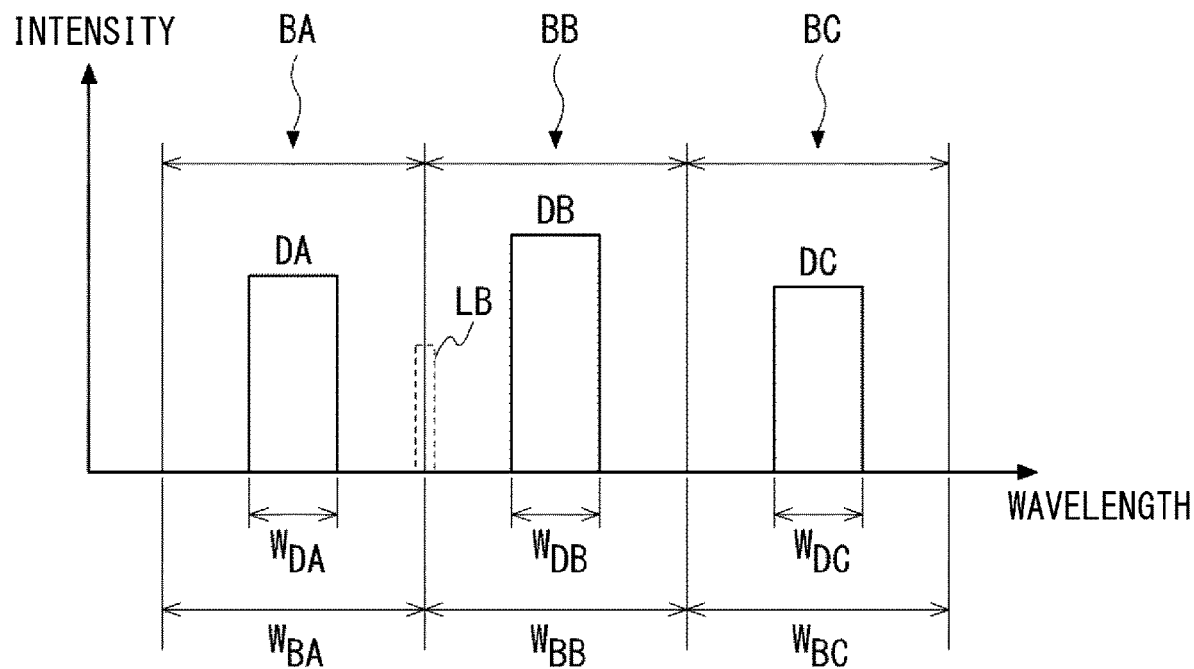
FIG. 21 is a view showing the case where an optical signal overlaps two coverage bands.

The control unit 4 determines whether the optical signal LB overlaps two coverage bands. To simplify the description, the control unit 4 determines whether the optical signal LB overlaps the corresponding coverage band BB and the adjacent coverage band BA in this example. FIG. 21 shows the case where the optical signal LB overlaps the two coverage bands BB and BA.

Step SA42

Figure 22:
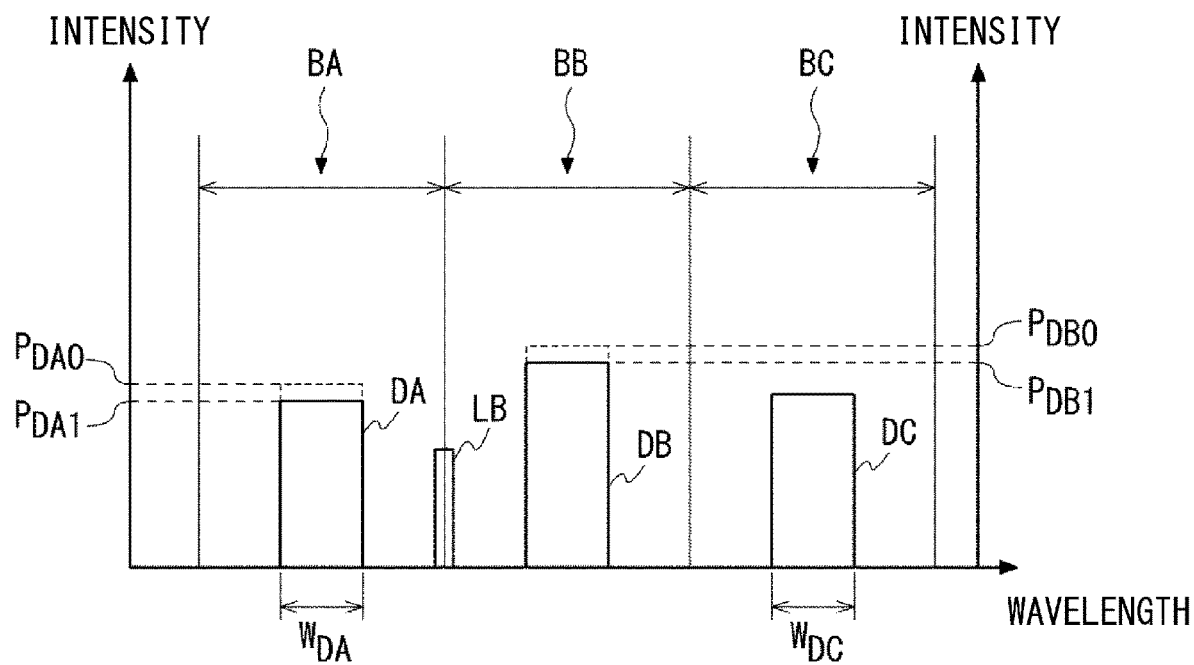
FIG. 22 is a view showing an optical signal and dummy lights in the case where a compensation function by a dummy light in a coverage band is distributed between by dummy lights in two coverage bands.

In the present example embodiment, when the optical signal LB overlaps the two coverage bands BB and BA, the compensation function by the dummy light DB in the coverage band BB is distributed between the dummy light DB and the dummy light DA. FIG. 22 shows an optical signal and dummy lights in the case where the compensation function by the dummy light DB in the coverage band BB is distributed between the dummy light DB and the dummy light DA.

The control unit 4 reads the target value $P_{LB}$ of the optical signal LB by referring to the table TAB. At this time, the control unit 4 may update the target value $P_{LB}$ of the optical signal LB to be inserted based on the equation [15].

$$P_{LB} = \frac{P_{LA} + W_{LC}}{2} \quad [15]$$

The control unit 4 may update the target value $P_{LB}$ of the optical signal LB to be inserted based on the equation [16], just like the equation [1].

$$P_{LB} = \frac{P_{DA0} W_{DA} + P_{DC0} W_{DC}}{W_{BA} + W_{BC}} \quad [16]$$

In this case, the total intensity of the lights included in the coverage bands BA and BB needs to be constant before and after insertion of the optical signal LB. Thus, the dummy light intensities $P_{DA1}$ and $P_{DB1}$ in the coverage bands BA and BB before and after the insertion of the optical signal LB are determined to satisfy the following equation.

$$P_{DB0} W_{DB} + P_{DA0} W_{DA} = P_{DA1} W_{DA} + P_{DB1} W_{DB} + P_{LB} W_{LB} \quad [17]$$

Note that the dummy light intensities $P_{DA1}$ and $P_{DB1}$ in the coverage bands BA and BB after the insertion of the optical signal may be determined to satisfy the following relationship, in consideration of the intensity initial values before the insertion.

$$P_{DA1} : P_{DB1} = P_{DA0} : P_{DB0} \quad [18]$$

$$P_{DA1} = \frac{P_{DA0}}{P_{DB0}} \cdot P_{DB1} \quad [19]$$

Further, the dummy light intensities $P_{DA1}$ and $P_{DB1}$ in the coverage bands BA and BB after the insertion of the optical signal may be set according to the bandwidth of the optical signal LB included in each of the coverage bands BA and BC. For example, there can be a case where the band of the optical signal LB included in the coverage band BB is wider than the band of the optical signal LB included in the coverage band BA. In this case, a decreased amount from the dummy light intensity initial value $P_{DA0}$ to the dummy light intensity $P_{DA1}$ may be set to be greater than a decreased amount from the dummy light intensity initial value $P_{DB0}$ to the dummy light intensity $P_{DB1}$.

Step SA43

The control unit 4 outputs the control signal C2 to the dummy light output unit 2 to control the intensities of the dummy lights DA and DB. In response to the control signal C2, the dummy light output unit 2 adjusts the intensities of the alternative dummy lights to the calculated value.

As described above, in accordance with the optical transmission apparatus according to this example embodiment, even when the inserted optical signal overlaps two coverage bands, the intensity of dummy lights in the two coverage bands can be adjusted according to the target value of the inserted optical signal. Thus, it is possible to maintain the total light intensity in the two coverage bands and apply the wavelength dependence that cancels out the wavelength dependence occurring due to transmission to the wavelength-multiplexed optical signal.

Fifth Example Embodiment

An optical transmission apparatus according to a fifth example embodiment is described hereinafter. In the above-described example embodiments, an example of dummy lights and coverage bands corresponding thereto is described with reference to FIG. 5. In the example shown in FIG. 5 (first example), although the dummy light is inserted substantially at the center of the coverage band, this is merely one example.

Figure 23:
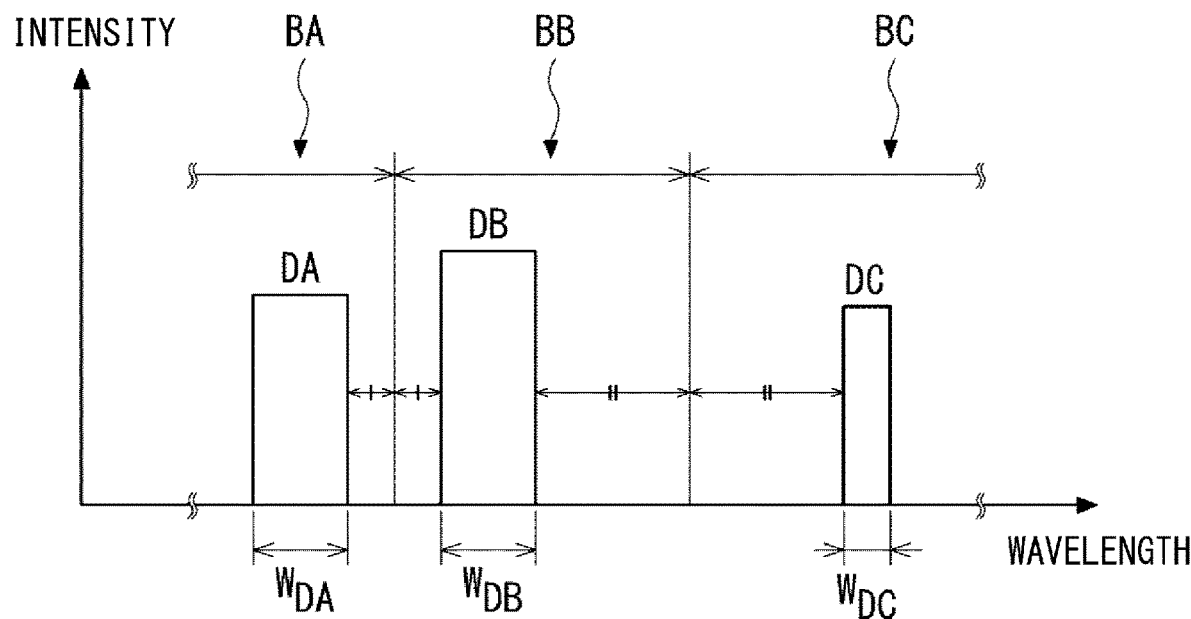
FIG. 23 is a view showing a second example of dummy lights and coverage bands corresponding thereto.

FIG. 23 shows a second example of dummy lights and coverage bands corresponding thereto. In this example, a boundary of coverage bands is placed at the midpoint between the opposed edges of two adjacent dummy lights. Specifically, the boundary between the coverage band BA and the coverage band BB is placed at the midpoint between the edge of the dummy light DA on the long wavelength side and the edge of the dummy light DB on the short wavelength side. The boundary between the coverage band BB and the coverage band BC is placed at the midpoint between the edge of the dummy light DB on the long wavelength side and the edge of the dummy light DC on the short wavelength side.

Figure 24:
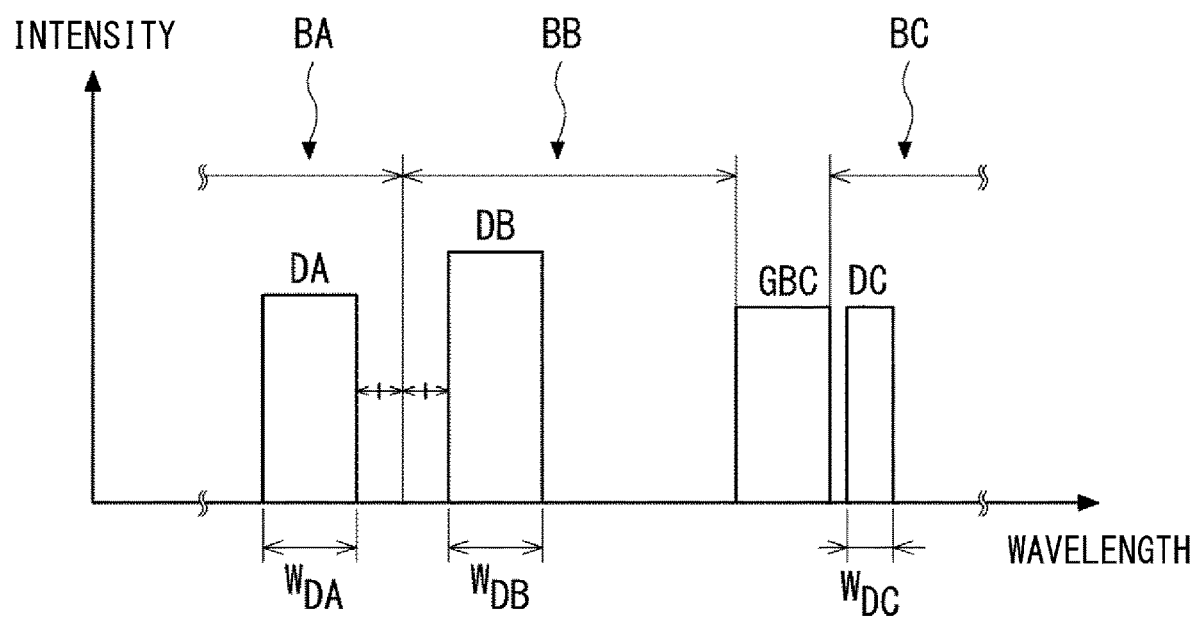
FIG. 24 is a view showing a third example of dummy lights and coverage bands corresponding thereto.

FIG. 24 shows a third example of dummy lights and coverage bands corresponding thereto. The third example is a modified example of the second example, and a guard band GBC is placed on the short wavelength side of the dummy light DC. The guard band GBC is set as a band in which a dummy light and a signal light are not included.

The boundary between the coverage band BA and the coverage band BB is placed at the midpoint between the edge of the dummy light DA on the long wavelength side and the edge of the dummy light DB on the short wavelength side as in the second example.

The boundary of the coverage band BB on the long wavelength side is placed at the edge of the guard band GBC on the short wavelength side. Further, the boundary of the coverage band BC on the short wavelength side is placed at the edge of the guard band GBC on the long wavelength side. That is, the coverage band BB and the coverage band BC are set not to include the guard band GBC. Thus, since a band into which a signal light can be inserted and a coverage band match, a target value can be calculated by averaging the product of the dummy light intensity initial value and the bandwidth of the dummy light by the band into which the signal light can be inserted. As a result, an output wavelength-multiplexed optical signal can be accurately approximate to the intensity distribution in consideration of the wavelength dependence in the transmission line. Note that the coverage band may be set to include the guard band.

Figure 25:
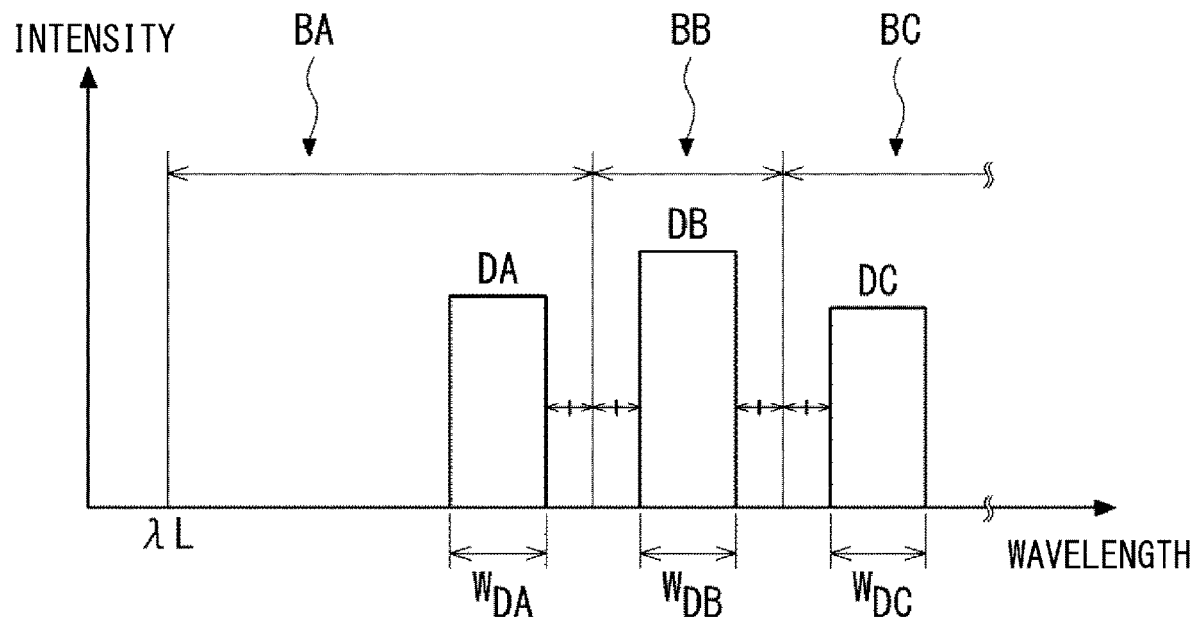
FIG. 25 is a view showing a fourth example of dummy lights and coverage bands corresponding thereto.

FIG. 25 shows a fourth example of dummy lights and coverage bands corresponding thereto. In this example, the dummy light DA on the short wavelength side is placed at the short wavelength-side end of a band that is monitored in a system in which the optical transmission apparatus is used. In this case, the boundary of the coverage band BA on the short wavelength side is set at the lower limit λL of the monitored band on the short wavelength side. Note that the boundary between the coverage band BB and the coverage band BC may be placed at the midpoint between the edge of the dummy light DB on the long wavelength side and the edge of the dummy light DC on the short wavelength side.

Figure 26:
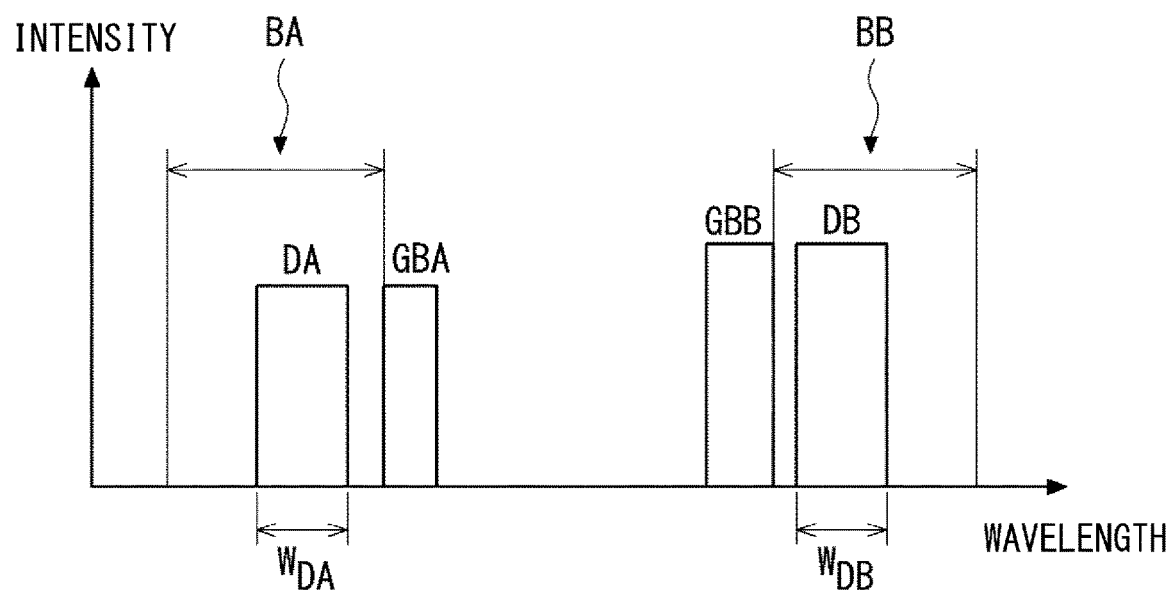
FIG. 26 is a view showing a fifth example of dummy lights and coverage bands corresponding thereto.

FIG. 26 shows a fifth example of dummy lights and coverage bands corresponding thereto.

In this example, a guard band GBA is placed on the long wavelength side of the dummy light DA, and a guard band GBB is placed on the short wavelength side of the dummy light DB. The guard band GBA is set as a band in which a dummy light and a signal light are not included.

The boundary of the coverage band BB on the short wavelength side is placed at the edge of the guard band GBB on the long wavelength side. The boundary of the coverage band BB on the short wavelength side is placed at the edge of the guard band GBA on the long wavelength side. There is no coverage band between the edge of the guard band GBA on the long wavelength side and the edge of the guard band GBB on the short wavelength side. Thus, since a band into which a signal light can be inserted and a coverage band match a target value can be calculated by averaging the product of the dummy light intensity initial value and the bandwidth of the dummy light by the band into which the signal light can be inserted. As a result, an output wavelength-multiplexed optical signal can be accurately approximate to the intensity distribution in consideration of the wavelength dependence in the transmission line. Note that the coverage band may be set to include the guard bang.

Note that, however, a band between the edge of the guard band GBA on the long wavelength side and the edge of the guard band GBB on the short wavelength side may be included in the coverage band BA or may be included in the coverage band BB according to need.

The above-described second to fifth examples may be applied to the optical transmission apparatus according to the first to fourth example embodiments according to need.

Other Example Embodiments

Note that the present invention is not limited to the above-described example embodiments, and various changes may be made therein without departing from the spirit and scope of the present invention. For example, in the third and fourth example embodiments, an example where a compensation function of one dummy light is implemented by two dummy lights is described. However, the compensation function of one dummy light is implemented by three or more dummy lights.

For example, the whole or part of the example embodiment disclosed above can be described as, but not limited to, the following supplementary notes.

(Supplementary Note 1) An optical transmission apparatus including: an optical signal adjustment unit configured to be capable of receiving input of a plurality of optical signals with different wavelengths, adjust an intensity of each of the plurality of optical signals based on an intensity change in a transmission line, and output the optical signals; a dummy light output unit configured to output a plurality of dummy lights with different wavelengths, each dummy light having an intensity based on an intensity change in a transmission line; a control unit configured to identify the dummy light corresponding to each of the optical signals, and control an intensity of the identified dummy light based on an intensity of the optical signal corresponding to the identified dummy light and output from the optical signal adjustment unit; and a multiplexing unit configured to combine the dummy light and the optical signal output from the optical signal adjustment unit to output a wavelength-multiplexed optical signal.

(Supplementary Note 2) The optical transmission apparatus according to Supplementary Note 1, in which the optical signal adjustment unit adjusts intensities of the plurality of optical signals so that the intensities of the plurality of optical signals after transmission is uniform.

(Supplementary Note 3) The optical transmission apparatus according to Supplementary Note 1 or 2, in which when information indicating a wavelength of an optical signal to be newly input to the optical signal adjustment unit and inserted into the wavelength-multiplexed optical signal is received, the control unit identifies the dummy light according to the information indicating the wavelength.

(Supplementary Note 4) The optical transmission apparatus according to Supplementary Note 1 or 2, further including: an optical detection unit configured to be capable of detecting wavelengths of the plurality of optical signals output from the optical signal adjustment unit, in which when information notifying that a new optical signal is to be input to the optical signal adjustment unit and inserted into the wavelength-multiplexed optical signal is received, the optical detection unit detects a wavelength of an optical signal whose intensity has changed greater than a predetermined value among the plurality of optical signals output from the optical signal adjustment unit, and notifies the control unit of the detected wavelength, and the control unit identifies the dummy light according to the notified wavelength.

(Supplementary Note 5) The optical transmission apparatus according to any one of Supplementary Notes 1 to 4, in which each of the dummy lights has a coverage band with an identified bandwidth, and when the optical signal is to be inserted into the coverage band, the control unit decreases the intensity of the dummy light corresponding to the coverage band according to the intensity of the optical signal to be inserted.

(Supplementary Note 6) The optical transmission apparatus according to Supplementary Note 5, in which when the optical signal is to be inserted into the coverage band, the control unit decreases the intensity of the dummy light in the coverage band by a value obtained by dividing a product of the optical signal to be inserted and a bandwidth of the optical signal to be inserted by a bandwidth of the dummy light.

(Supplementary Note 7) The optical transmission apparatus according to Supplementary Note 5 or 6, in which when the optical signal overlaps the dummy light, the control unit: interrupts the dummy light overlapping the optical signal; increases an intensity of a dummy light corresponding to one or more other coverage bands according to the intensity of the interrupted dummy light; and decreases the dummy light with an adjusted intensity according to the intensity of the optical signal to be inserted.

(Supplementary Note 8) The optical transmission apparatus according to any one of Supplementary Notes 5 to 7, in which when the optical signal overlaps two coverage bands, the control unit decreases intensities of dummy lights in the two coverage bands according to the intensity of the optical signal to be inserted.

(Supplementary Note 9) The optical transmission apparatus according to any one of Supplementary Notes 5 to 8, in which a target value of the intensity of the optical signal to be inserted is a value obtained by dividing a sum of products of an intensity before adjustment of each of one or more dummy lights whose intensity is to be adjusted according to insertion of the optical signal and a bandwidth of each of the one or more dummy lights by a sum of bandwidths of coverage bands corresponding to the one or more dummy lights.

(Supplementary Note 10) The optical transmission apparatus according to any one of Supplementary Notes 5 to 8, in which the intensity of the optical signal to be inserted is an average of a target value of intensity when another optical signal is inserted into each coverage band of one or more dummy lights whose intensities are adjusted according to insertion of the optical signal.

(Supplementary Note 11) The optical transmission apparatus according to any one of Supplementary Notes 5 to 10, in which the dummy light is placed at a center of the corresponding coverage band.

(Supplementary Note 12) The optical transmission apparatus according to any one of Supplementary Notes 5 to 10, in which a boundary between coverage bands corresponding to two adjacent dummy lights is placed at an intermediate wavelength between the two dummy lights.

(Supplementary Note 13) The optical transmission apparatus according to any one of Supplementary Notes 5 to 10, in which when a guard band is placed between two adjacent dummy lights, a boundary between coverage bands corresponding to the two dummy lights is placed at a long wavelength-side end or a long wavelength-side end of the guard band.

(Supplementary Note 14) The optical transmission apparatus according to any one of Supplementary Notes 5 to 10, in which when a predetermined band including the plurality of dummy lights and the plurality of optical signals is placed, a boundary of a coverage band corresponding to the dummy light closest to an end of the predetermined band, the boundary being on a side of the end of the predetermined band, is placed at the end of the predetermined band.

(Supplementary Note 15) The optical transmission apparatus according to any one of Supplementary Notes 5 to 10, in which when two guard bands are placed between two adjacent dummy lights, no coverage band is set between two opposed ends of the two guard bands.

(Supplementary Note 16) A terminal apparatus including: one or more optical transceivers; and an optical transmission apparatus configured to receive input of a plurality of optical signals with different wavelengths from the one or more optical transceivers, in which the optical transmission apparatus includes: an optical signal adjustment unit configured to be capable of receiving input of the plurality of optical signals, adjust an intensity of each of the plurality of optical signals based on an intensity change in a transmission line, and output the optical signals; a dummy light output unit configured to output a plurality of dummy lights with different wavelengths, each dummy light having an intensity based on an intensity change in a transmission line; a control unit configured to identify the dummy light corresponding to each of the optical signals, and control an intensity of the identified dummy light based on an intensity of the optical signal corresponding to the identified dummy light and output from the optical signal adjustment unit; and a multiplexing unit configured to combine the dummy light and the optical signal output from the optical signal adjustment unit to output a wavelength-multiplexed optical signal.

(Supplementary Note 17) The terminal apparatus according to Supplementary Note 16, in which the optical signal adjustment unit adjusts intensities of the plurality of optical signals so that the intensities of the plurality of optical signals after transmission is uniform.

(Supplementary Note 18) The terminal apparatus according to Supplementary Note 16 or 17, in which when information indicating a wavelength of an optical signal to be newly input to the optical signal adjustment unit and inserted into the wavelength-multiplexed optical signal is received, the control unit identifies the dummy light according to the information indicating the wavelength.

(Supplementary Note 19) The terminal apparatus according to Supplementary Note 16 or 17, further including: an optical detection unit configured to be capable of detecting wavelengths of the plurality of optical signals output from the optical signal adjustment unit, in which when information notifying that a new optical signal is to be input to the optical signal adjustment unit and inserted into the wavelength-multiplexed optical signal is received, the optical detection unit detects a wavelength of an optical signal whose intensity has changed greater than a predetermined value among the plurality of optical signals output from the optical signal adjustment unit, and notifies the control unit of the detected wavelength, and the control unit identifies the dummy light according to the notified wavelength.

(Supplementary Note 20) The terminal apparatus according to any one of Supplementary Notes 16 to 19, in which each of the dummy lights has a coverage band with an identified bandwidth, and when the optical signal is to be inserted into the coverage band, the control unit decreases the intensity of the dummy light corresponding to the coverage band according to the intensity of the optical signal to be inserted.

(Supplementary Note 21) The terminal apparatus according to Supplementary Note 20, in which when the optical signal is to be inserted into the coverage band, the control unit decreases the intensity of the dummy light in the coverage band by a value obtained by dividing a product of the optical signal to be inserted and a bandwidth of the optical signal to be inserted by a bandwidth of the dummy light.

(Supplementary Note 22) The terminal apparatus according to Supplementary Note 20 or 21, in which when the optical signal overlaps the dummy light, the control unit: interrupts the dummy light overlapping the optical signal; increases an intensity of a dummy light corresponding to one or more other coverage bands according to the intensity of the interrupted dummy light; and decreases the dummy light with an adjusted intensity according to the intensity of the optical signal to be inserted.

(Supplementary Note 23) The terminal apparatus according to any one of Supplementary Notes 20 to 22, in which when the optical signal overlaps two coverage bands, the control unit decreases intensities of dummy lights in the two coverage bands according to the intensity of the optical signal to be inserted.

(Supplementary Note 24) The terminal apparatus according to any one of Supplementary Notes 20 to 23, in which a target value of the intensity of the optical signal to be inserted is a value obtained by dividing a sum of products of an intensity before adjustment of each of one or more dummy lights whose intensity is to be adjusted according to insertion of the optical signal and a bandwidth of each of the one or more dummy lights by a sum of bandwidths of coverage bands corresponding to the one or more dummy lights.

(Supplementary Note 25) The terminal apparatus according to any one of Supplementary Notes 20 to 23, in which the intensity of the optical signal to be inserted is an average of a target value of intensity when another optical signal is inserted into each coverage band of one or more dummy lights whose intensities are to be adjusted according to insertion of the optical signal.

(Supplementary Note 26) The terminal apparatus according to any one of Supplementary Notes 20 to 25, in which the dummy light is placed at a center of the corresponding coverage band.

(Supplementary Note 27) The terminal apparatus according to any one of Supplementary Notes 20 to 25, in which a boundary between coverage bands corresponding to two adjacent dummy lights is placed at an intermediate wavelength between the two dummy lights.

(Supplementary Note 28) The terminal apparatus according to any one of Supplementary Notes 20 to 25, in which when a guard band is placed between two adjacent dummy lights, a boundary between coverage bands corresponding to the two dummy lights is placed at a long wavelength-side end or a long wavelength-side end of the guard band.

(Supplementary Note 29) The terminal apparatus according to any one of Supplementary Notes 20 to 25, in which when a predetermined band including the plurality of dummy lights and the plurality of optical signals is placed, a boundary of a coverage band corresponding to the dummy light closest to an end of the predetermined band, the boundary being on a side of the end of the predetermined band, is placed at the end of the predetermined band.

(Supplementary Note 30) The terminal apparatus according to any one of Supplementary Notes 20 to 25, in which when two guard bands are placed between two adjacent dummy lights, no coverage band is set between two opposed ends of the two guard bands.

(Supplementary Note 31) An optical communication system including: a first terminal station configured to output a wavelength-multiplexed optical signal; and a second terminal station configured to receive the wavelength-multiplexed optical signal, in which the first terminal station includes: one or more optical transceivers; and an optical transmission apparatus configured to receive input of a plurality of optical signals with different wavelengths from the one or more optical transceivers, and the optical transmission apparatus includes: an optical signal adjustment unit configured to be capable of receiving input of the plurality of optical signals, adjust an intensity of each of the plurality of optical signals based on an intensity change in a transmission line, and output the optical signals; a dummy light output unit configured to output a plurality of dummy lights with different wavelengths, each dummy light having an intensity based on an intensity change in a transmission line; a control unit configured to identify the dummy light corresponding to each of the optical signals, and control an intensity of the identified dummy light based on an intensity of the optical signal corresponding to the identified dummy light and output from the optical signal adjustment unit; and a multiplexing unit configured to combine the dummy light and the optical signal output from the optical signal adjustment unit to output the wavelength-multiplexed optical signal.

(Supplementary Note 32) The optical communication system according to Supplementary Note 31, in which the optical signal adjustment unit adjusts intensities of the plurality of optical signals so that the intensities of the plurality of optical signals after transmission is uniform.

(Supplementary Note 33) The optical communication system according to Supplementary Note 31 or 32, when information indicating a wavelength of an optical signal to be newly input to the optical signal adjustment unit and inserted into the wavelength-multiplexed optical signal is received, the control unit identifies the dummy light according to the information indicating the wavelength.

(Supplementary Note 34) The optical communication system according to Supplementary Note 31 or 32, further including: an optical detection unit configured to be capable of detecting wavelengths of the plurality of optical signals output from the optical signal adjustment unit, in which when information notifying that a new optical signal is to be input to the optical signal adjustment unit and inserted into the wavelength-multiplexed optical signal is received, the optical detection unit detects a wavelength of an optical signal whose intensity has changed greater than a predetermined value among the plurality of optical signals output from the optical signal adjustment unit, and notifies the control unit of the detected wavelength, and the control unit identifies the dummy light according to the notified wavelength.

(Supplementary Note 35) The optical communication system according to any one of Supplementary Notes 31 to 34, in which each of the dummy lights has a coverage band with an identified bandwidth, and when the optical signal is to be inserted into the coverage band, the control unit decreases the intensity of the dummy light corresponding to the coverage band according to the intensity of the optical signal to be inserted.

(Supplementary Note 36) The optical communication system according to Supplementary Note 35, in which when the optical signal is to be inserted into the coverage band, the control unit decreases the intensity of the dummy light in the coverage band by a value obtained by dividing a product of the optical signal to be inserted and a bandwidth of the optical signal to be inserted by a bandwidth of the dummy light.

(Supplementary Note 37) The optical communication system according to Supplementary Note 35 or 36, in which when the optical signal overlaps the dummy light, the control unit: interrupts the dummy light overlapping the optical signal; increases an intensity of a dummy light corresponding to one or more other coverage bands according to the intensity of the interrupted dummy light; and decreases the dummy light with adjusted the intensity according to an intensity of the optical signal to be inserted.

(Supplementary Note 38) The optical communication system according to any one of Supplementary Notes 35 to 37, in which when the optical signal overlaps two coverage bands, the control unit decreases intensities of dummy lights in the two coverage bands according to the intensity of the optical signal to be inserted.

(Supplementary Note 39) The optical communication system according to any one of Supplementary Notes 35 to 38, in which a target value of the intensity of the optical signal to be inserted is a value obtained by dividing a sum of products of an intensity before adjustment of each of one or more dummy lights whose intensity is to be adjusted according to insertion of the optical signal and a bandwidth of each of the one or more dummy lights by a sum of bandwidths of coverage bands corresponding to the one or more dummy lights.

(Supplementary Note 40) The optical communication system according to any one of Supplementary Notes 35 to 38, in which the intensity of the optical signal to be inserted is an average of a target value of intensity when another optical signal is inserted into each coverage band of one or more dummy lights whose intensities are adjusted according to insertion of the optical signal.

(Supplementary Note 41) The optical communication system according to any one of Supplementary Notes 35 to 40, in which the dummy light is placed at a center of the corresponding coverage band.

(Supplementary Note 42) The optical communication system according to any one of Supplementary Notes 35 to 40, in which a boundary between coverage bands corresponding to two adjacent dummy lights is placed at an intermediate wavelength between the two dummy lights.

(Supplementary Note 43) The optical communication system according to any one of Supplementary Notes 35 to 40, in which when a guard band is placed between two adjacent dummy lights, a boundary between coverage bands corresponding to the two dummy lights is placed at a long wavelength-side end or a long wavelength-side end of the guard band.

(Supplementary Note 44) The optical communication system according to any one of Supplementary Notes 35 to 40, in which when a predetermined band including the plurality of dummy lights and the plurality of optical signals is placed, a boundary of a coverage band corresponding to the dummy light closest to an end of the predetermined band, the boundary being on a side of the end of the predetermined band, is placed at the end of the predetermined band.

(Supplementary Note 45) The optical communication system according to any one of Supplementary Notes 35 to 40, in which when two guard bands are placed between two adjacent dummy lights, no coverage band is set between two opposed ends of the two guard bands.

(Supplementary Note 46) An optical communication method including: adjusting an intensity of each of a plurality of optical signals with different wavelengths based on an intensity change in a transmission line and outputting the optical signals; outputting a plurality of dummy lights with different wavelengths, each dummy light having an intensity based on an intensity change in a transmission line; identifying the dummy light corresponding to each of the optical signals, and controlling an intensity of the specified dummy light based on the intensity of the optical signal based on an intensity change in the transmission line corresponding to the identified dummy light; and outputting a wavelength-multiplexed optical signal in which the dummy light and the optical signal with an adjusted intensity are combined.

(Supplementary Note 47) The optical communication method according to Supplementary Note 46, in which intensities of the plurality of optical signals are adjusted so that the intensities of the plurality of optical signals after transmission is uniform.

(Supplementary Note 48) The optical communication method according to Supplementary Note 46 or 47, in which information indicating a wavelength of an optical signal to be newly inserted into the wavelength-multiplexed optical signal is received, and the dummy light is identified according to the information indicating the wavelength.

(Supplementary Note 49) The optical communication method according to Supplementary Note 46 or 47, in which information notifying that a new optical signal is to be inserted into the wavelength-multiplexed optical signal is received, a wavelength of an optical signal whose intensity has changed greater than a predetermined value among the plurality of optical signals with an adjusted intensity is detected, and the dummy light is identified according to the detected wavelength.

(Supplementary Note 50) The optical communication method according to any one of Supplementary Notes 46 to 49, in which each of the dummy lights has a coverage band with an identified bandwidth, and when the optical signal is to be inserted into the coverage band, the intensity of the dummy light corresponding to the coverage band is decreased according to the intensity of the optical signal to be inserted.

(Supplementary Note 51) The optical communication method according to Supplementary Note 50, in which when the optical signal is to be inserted into the coverage band, the intensity of the dummy light in the coverage band is decreased by a value obtained by dividing a product of the optical signal to be inserted and a bandwidth of the optical signal to be inserted by a bandwidth of the dummy light.

(Supplementary Note 52) The optical communication method according to Supplementary Note 50 or 51, in which when the optical signal overlaps the dummy light, the dummy light overlapping the optical signal is interrupted, an intensity of a dummy light corresponding to one or more other coverage bands is increased according to the intensity of the interrupted dummy light, and the dummy light with adjusted the intensity is decreased according to the intensity of the optical signal to be inserted.

(Supplementary Note 53) The optical communication method according to any one of Supplementary Notes 50 to 52, in which when the optical signal overlaps two coverage bands, intensities of dummy lights in the two coverage bands are decreased according to the intensity of the optical signal to be inserted.

(Supplementary Note 54) The optical communication method according to any one of Supplementary Notes 50 to 53, in which a target value of the intensity of the optical signal to be inserted is a value obtained by dividing a sum of products of an intensity before adjustment of each of one or more dummy lights whose intensity is to be adjusted according to insertion of the optical signal and a bandwidth of each of the one or more dummy lights by a sum of bandwidths of coverage bands corresponding to the one or more dummy lights.

(Supplementary Note 55) The optical communication method according to any one of Supplementary Notes 50 to 53, in which the intensity of the optical signal to be inserted is an average of a target value of intensity when another optical signal is inserted into each coverage band of one or more dummy lights whose intensities are adjusted according to insertion of the optical signal.

(Supplementary Note 56) The optical communication method according to any one of Supplementary Notes 50 to 55, in which the dummy light is placed at a center of the corresponding coverage band.

(Supplementary Note 57) The optical communication method according to any one of Supplementary Notes 50 to 55, in which a boundary between coverage bands corresponding to two adjacent dummy lights is placed at an intermediate wavelength between the two dummy lights.

(Supplementary Note 58) The optical communication method according to any one of Supplementary Notes 50 to 55, in which when a guard band is placed between two adjacent dummy lights, a boundary between coverage bands corresponding to the two dummy lights is placed at a long wavelength-side end or a long wavelength-side end of the guard band.

(Supplementary Note 59) The optical communication method according to any one of Supplementary Notes 50 to 55, in which when a predetermined band including the plurality of dummy lights and the plurality of optical signals is placed, a boundary of a coverage band corresponding to the dummy light closest to an end of the predetermined band, the boundary being on a side of the end of the predetermined band, is placed at the end of the predetermined band.

(Supplementary Note 60) The optical communication method according to any one of Supplementary Notes 50 to 55, in which when two guard bands are placed between two adjacent dummy lights, no coverage band is set between two opposed ends of the two guard bands.

Although the present invention is explained above with reference to example embodiments, the present invention is not limited to the above-described example embodiments. Various modifications that can be understood by those skilled in the art can be made to the configuration and details of the present invention within the scope of the invention.

This application is based upon and claims the benefit of priority from Japanese patent applications No. 2018-232610, filed on Dec. 12, 2018, the disclosure of which is incorporated herein in its entirety by reference.

REFERENCE SIGNS LIST

AMP OPTICAL AMPLIFIER
BA, BB, BC COVERAGE BANDS
C1, C2 CONTROL SIGNALS
D, DA, DB, DC DUMMY LIGHTS
DET DETECTION SIGNAL
F OPTICAL FIBER
GBA, GBB, GBC GUARD BANDS
INS INSTRUCTION SIGNAL
L WAVELENGTH-MULTIPLEXED OPTICAL SIGNAL
L1, L2, L10 OPTICAL SIGNALS
LB OPTICAL SIGNAL
TAB TABLE
TL1, TL2 TRANSMISSION LINES
TPD, TPD1, TPD2 OPTICAL TRANSCEIVERS
TS1, TS2 TERMINAL STATIONS
1 OPTICAL SIGNAL ADJUSTMENT UNIT
2 DUMMY LIGHT OUTPUT UNIT
3 MULTIPLEXING UNIT
4 CONTROL UNIT
5 DEMULTIPLEXER
6 PHOTODETECTOR
100, 200 OPTICAL TRANSMISSION APPARATUSES
1000 OPTICAL COMMUNICATION SYSTEM
1001 MANAGEMENT SERVER

What is claimed is:

1. An optical transmission apparatus comprising:
an optical signal adjustment unit configured to be capable of receiving input of a plurality of optical signals with different wavelengths, adjust an intensity of each of the plurality of optical signals based on an intensity change in a transmission line, and output the optical signals;
a dummy light output unit configured to output a plurality of dummy lights with different wavelengths, each dummy light having an intensity based on an intensity change in a transmission line;
a control unit configured to identify the dummy light corresponding to each of the optical signals, and control an intensity of the identified dummy light based on an intensity of the optical signal corresponding to the identified dummy light and output from the optical signal adjustment unit;
a multiplexing unit configured to combine the dummy light and the optical signal output from the optical signal adjustment unit to output a wavelength-multiplexed optical signal; and
an optical detection unit configured to be capable of detecting wavelengths of the plurality of optical signals output from the optical signal adjustment unit, wherein
when information notifying that a new optical signal is to be input to the optical signal adjustment unit and inserted into the wavelength-multiplexed optical signal is received,
the optical detection unit detects a wavelength of an optical signal whose intensity has changed greater than a predetermined value among the plurality of optical signals output from the optical signal adjustment unit, and notifies the control unit of the detected wavelength, and
the control unit identifies the dummy light according to the notified wavelength.

2. The optical transmission apparatus according to claim 1, wherein the optical signal adjustment unit adjusts intensities of the plurality of optical signals so that the intensities of the plurality of optical signals after transmission is uniform.

3. The optical transmission apparatus according to claim 1, wherein
each of the dummy lights has a coverage band with an identified bandwidth, and
when the optical signal is to be inserted into the coverage band, the control unit decreases the intensity of the dummy light corresponding to the coverage band according to the intensity of the optical signal to be inserted.

4. The optical transmission apparatus according to claim 3, wherein when the optical signal is to be inserted into the coverage band, the control unit decreases the intensity of the dummy light in the coverage band by a value obtained by dividing a product of the optical signal to be inserted and a bandwidth of the optical signal to be inserted by a bandwidth of the dummy light.

5. The optical transmission apparatus according to claim 3, wherein
when the optical signal overlaps the dummy light, the control unit:
interrupts the dummy light overlapping the optical signal;
increases an intensity of a dummy light corresponding to one or more other coverage bands according to the intensity of the interrupted dummy light; and
decreases the dummy light with an adjusted intensity according to the intensity of the optical signal to be inserted.

6. The optical transmission apparatus according to claim 3, wherein when the optical signal overlaps two coverage bands, the control unit decreases intensities of dummy lights in the two coverage bands according to the intensity of the optical signal to be inserted.

7. The optical transmission apparatus according to claim 3, wherein a target value of the intensity of the optical signal to be inserted is a value obtained by dividing a sum of products of an intensity before adjustment of each of one or more dummy lights whose intensity is to be adjusted according to insertion of the optical signal and a bandwidth of each of the one or more dummy lights by a sum of bandwidths of coverage bands corresponding to the one or more dummy lights.

8. The optical transmission apparatus according to claim 3, wherein the intensity of the optical signal to be inserted is an average of a target value of intensity when another optical signal is inserted into each coverage band of one or more dummy lights whose intensities are adjusted according to insertion of the optical signal.

9. The optical transmission apparatus according to claim 3, wherein the dummy light is placed at a center of the corresponding coverage band.

10. The optical transmission apparatus according to claim 3, wherein a boundary between coverage bands corresponding to two adjacent dummy lights is placed at an intermediate wavelength between the two dummy lights.

11. The optical transmission apparatus according to claim 3, wherein when a guard band is placed between two adjacent dummy lights, a boundary between coverage bands corresponding to the two dummy lights is placed at a long wavelength-side end or a short wavelength-side end of the guard band.

12. The optical transmission apparatus according to claim 3, wherein when a predetermined band including the plurality of dummy lights and the plurality of optical signals is placed, a boundary of a coverage band corresponding to the dummy light closest to an end of the predetermined band, the boundary being on a side of the end of the predetermined band, is placed at the end of the predetermined band.

13. The optical transmission apparatus according to claim 3, wherein when two guard bands are placed between two adjacent dummy lights, no coverage band is set between two opposed ends of the two guard bands.

14. A terminal apparatus comprising:
one or more optical transceivers; and
an optical transmission apparatus configured to receive input of a plurality of optical signals with different wavelengths from the one or more optical transceivers, wherein
the optical transmission apparatus includes:
an optical signal adjustment unit configured to be capable of receiving input of the plurality of optical signals, adjust an intensity of each of the plurality of optical signals based on an intensity change in a transmission line, and output the optical signals;
a dummy light output unit configured to output a plurality of dummy lights with different wavelengths, each dummy light having an intensity based on an intensity change in a transmission line;
a control unit configured to identify the dummy light corresponding to each of the optical signals, and control an intensity of the identified dummy light based on an intensity of the optical signal corresponding to the identified dummy light and output from the optical signal adjustment unit;
a multiplexing unit configured to combine the dummy light and the optical signal output from the optical signal adjustment unit to output a wavelength-multiplexed optical signal; and
an optical detection unit configured to be capable of detecting wavelengths of the plurality of optical signals output from the optical signal adjustment unit, wherein
when information notifying that a new optical signal is to be input to the optical signal adjustment unit and inserted into the wavelength-multiplexed optical signal is received,
the optical detection unit detects a wavelength of an optical signal whose intensity has changed greater than a predetermined value among the plurality of optical signals output from the optical signal adjustment unit, and notifies the control unit of the detected wavelength, and
the control unit identifies the dummy light according to the notified wavelength.

15. The terminal apparatus according to claim 14, wherein the optical signal adjustment unit adjusts intensities of the plurality of optical signals so that the intensities of the plurality of optical signals after transmission is uniform.

16. An optical communication system comprising:
a first terminal station configured to output a wavelength-multiplexed optical signal; and
a second terminal station configured to receive the wavelength-multiplexed optical signal, wherein
the first terminal station includes:
one or more optical transceivers; and
an optical transmission apparatus configured to receive input of a plurality of optical signals with different wavelengths from the one or more optical transceivers, and
the optical transmission apparatus includes:
an optical signal adjustment unit configured to be capable of receiving input of the plurality of optical signals, adjust an intensity of each of the plurality of optical signals based on an intensity change in a transmission line, and output the optical signals;
a dummy light output unit configured to output a plurality of dummy lights with different wavelengths, each dummy light having an intensity based on an intensity change in a transmission line;
a control unit configured to identify the dummy light corresponding to each of the optical signals, and control an intensity of the identified dummy light based on an intensity of the optical signal corresponding to the identified dummy light and output from the optical signal adjustment unit; and
a multiplexing unit configured to combine the dummy light and the optical signal output from the optical signal adjustment unit to output the wavelength-multiplexed optical signal; and
an optical detection unit configured to be capable of detecting wavelengths of the plurality of optical signals output from the optical signal adjustment unit, wherein
when information notifying that a new optical signal is to be input to the optical signal adjustment unit and inserted into the wavelength-multiplexed optical signal is received,
the optical detection unit detects a wavelength of an optical signal whose intensity has changed greater than a predetermined value among the plurality of optical signals output from the optical signal adjustment unit, and notifies the control unit of the detected wavelength, and
the control unit identifies the dummy light according to the notified wavelength.

* * * * *